United States Patent
Määttänen et al.

(10) Patent No.: US 12,082,011 B2
(45) Date of Patent: Sep. 3, 2024

(54) CONFIGURING RADIO LINK MONITORING (RLM) FOR MOVING RADIO ACCESS NETWORK (RAN)

(71) Applicant: Telefonaktiebolaget LM Ericsson (publ), Stockholm (SE)

(72) Inventors: Helka-Liina Määttänen, Helsinki (FI); Talha Khan, Santa Clara, CA (US); Xingqin Lin, Santa Clara, CA (US); Henrik Rydén, Solna (SE); Sebastian Euler, Storvreta (SE); Olof Liberg, Enskede (SE)

(73) Assignee: Telefonaktiebolaget LM Ericsson (Pub, Stockholm (SE)

(*) Notice: Subject to any disclaimer, the term of this patent is extended or adjusted under 35 U.S.C. 154(b) by 507 days.

(21) Appl. No.: 17/285,252

(22) PCT Filed: Nov. 1, 2019

(86) PCT No.: PCT/IB2019/059395
§ 371 (c)(1),
(2) Date: Apr. 14, 2021

(87) PCT Pub. No.: WO2020/089848
PCT Pub. Date: May 7, 2020

(65) Prior Publication Data
US 2021/0385675 A1  Dec. 9, 2021

Related U.S. Application Data

(60) Provisional application No. 62/754,108, filed on Nov. 1, 2018.

(51) Int. Cl.
*H04W 24/08* (2009.01)
*H04B 7/08* (2006.01)
(Continued)

(52) U.S. Cl.
CPC ............ *H04W 24/08* (2013.01); *H04B 7/088* (2013.01); *H04W 76/19* (2018.02); *H04W 76/28* (2018.02); *H04W 84/06* (2013.01)

(58) Field of Classification Search
CPC ..... H04W 24/08; H04W 76/19; H04W 76/28; H04W 84/06; H04W 36/0083; H04B 7/088; H04B 7/18539; H04B 7/1851
See application file for complete search history.

(56) References Cited

U.S. PATENT DOCUMENTS

2017/0347363 A1   11/2017 Roy
2018/0205585 A1*  7/2018 Sadiq ..................... H04B 7/088
(Continued)

FOREIGN PATENT DOCUMENTS

WO    2017189862 A1    11/2017

OTHER PUBLICATIONS

"3GPP TR 38.821 V0.1.0", 3rd Generation Partnership Project; Technical Specification Group Radio Access Network; Solutions for NR to support non-terrestrial networks (NTN) (Release 16), Sep. 2018, pp. 1-18.
(Continued)

Primary Examiner — Khaled M Kassim
Assistant Examiner — Hector Reyes
(74) Attorney, Agent, or Firm — Weisberg I.P. Law, P.A.

(57) ABSTRACT

Embodiments include methods for radio link monitoring (RLM) by a user equipment (UE) in a combined terrestrial and satellite wireless communication network. Such methods include, during a discontinuity in a connection between a UE and a terrestrial network node (TNN), performing RLM of the connection based on a second configuration. Such methods also include, before and/or after the discontinuity, performing RLM of the connection based on a first configuration. The connection includes a first link between
(Continued)

the UE and a satellite and a second link between the satellite and the TNN. The discontinuity includes a link switch in at least one of the first link and the second link. The RLM before, during, and after the discontinuity can include various first, second, and third operations, respectively. Embodiments also include complementary methods performed by a TNN, as well as UEs and TNNs configured to perform operations corresponding to such methods.

9 Claims, 10 Drawing Sheets

(51) Int. Cl.
*H04W 76/19* (2018.01)
*H04W 76/28* (2018.01)
*H04W 84/06* (2009.01)

(56) References Cited

U.S. PATENT DOCUMENTS

| | | | |
|---|---|---|---|
| 2019/0075597 A1* | 3/2019 | Yerramalli | H04W 8/22 |
| 2020/0052782 A1* | 2/2020 | Wang | H04W 76/27 |
| 2021/0028984 A1* | 1/2021 | Da Silva | H04L 41/0823 |
| 2021/0099933 A1* | 4/2021 | Matsuda | H04W 36/0072 |
| 2021/0144690 A1* | 5/2021 | Chen | H04L 5/0048 |
| 2021/0320710 A1* | 10/2021 | Koskela | H04B 17/309 |

OTHER PUBLICATIONS

"3GPP TS 36.113 V15.2.0", 3rd Generation Partnership Project; Technical Specification Group Radio Access Network; Evolved Universal Terrestrial Radio Access (E-UTRA); Base Station (BS) and repeater ElectroMagnetic Compatibility (EMC) (Release 15), Mar. 2018, pp. 1-34.
"3GPP TS 36.133 V14.9.0", 3rd Generation Partnership Project; Technical Specification Group Radio Access Network; Evolved Universal Terrestrial Radio Access (E-UTRA); Requirements for support of radio resource management (Release 14), Sep. 2018, pp. 1-2962.
"3GPP TS 36.213 V15.3.0", 3rd Generation Partnership Project; Technical Specification Group Radio Access Network; Evolved Universal Terrestrial Radio Access (E-UTRA); Physical layer procedures (Release 15), Sep. 2018, pp. 1-546.
"3GPP TS 38.133 V15.3.0", 3rd Generation Partnership Project; Technical Specification Group Radio Access Network; NR; Requirements for support of radio resource management (Release 15), Sep. 2018, pp. 1-136.
"3GPP TS 38.213 V15.3.0", 3rd Generation Partnership Project; Technical Specification Group Radio Access Network; NR; Physical layer procedures for control (Release 15), Sep. 2018, pp. 1-101.
"Mobility aspects for NTN NR", 3GPP TSG-RAN WG2 #103bis; Tdoc R2-1814933; Chengdu, China, Oct. 8-12, 2018, pp. 1-5.
"Study on solutions evaluation for NR to support Non Terrestrial Network", 3GPP TSG RAN meeting #80; RP-181370; La Jolla, USA, Jun. 11-14, 2018, pp. 1-5.
"3GPP TS 36.331 V15.3.0", 3rd Generation Partnership Project; Technical Specification Group Radio Access Network; Evolved Universal Terrestrial Radio Access (E-UTRA); Radio Resource Control (RRC); Protocol specification (Release 15), Sep. 2018, pp. 1-918.
3GPP TR 38.811 V15.0.0, 3rd Generation Partnership Project; Technical Specification Group Radio Access Network; Study on New Radio (NR) to support non terrestrial networks (Release 15), Jun. 2018, pp. 1-79.
"Study on NR to support Non-Terrestrial Networks", 3GPP TSG RAN WG1 Meeting 88bis, RP-171450, West Palm Beach, USA, Jun. 5-9, 2017, pp. 1-5.
"3GPP TS 36.133 V15.4.0", 3rd Generation Partnership Project; Technical Specification Group Radio Access Network; Evolved Universal Terrestrial Radio Access (E-UTRA); Requirements for support of radio resource management (Release 15), Sep. 2018, pp. 1-3227.

* cited by examiner

CONFIGURING RADIO LINK MONITORING (RLM) FOR MOVING RADIO ACCESS NETWORK (RAN)

TECHNICAL FIELD

The present invention generally relates to wireless communication networks, and particularly relates to improvements in the integration of non-terrestrial (e.g., satellite) wireless communication networks with terrestrial (e.g., cellular) wireless communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within 3GPP specifications, "user equipment" (or "UE") can refer to any wireless communication device (e.g., smartphone or computing device) that is capable of communicating with 3GPP-standard-compliant network equipment, including E-UTRAN and earlier-generation RANs (e.g., UTRAN/"3G" and/or GERAN/"2G") as well as later-generation RANs in some cases.

As specified by 3GPP, E-UTRAN 100 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 105, 110, and 115, which communicate with each other via an X1 interface. The eNBs also are responsible for the E-UTRAN interface to EPC 130, specifically the S1 interface to the Mobility Management Entity (MME) and the Serving Gateway (SGW), shown collectively as MME/S-GWs 134 and 138 in FIG. 1.

In general, the MME/S-GW handles both the overall control of the UE and data flow between UEs (such as UE 120) and the rest of the EPC. More specifically, the MME processes the signaling (e.g., control plane, CP) protocols between UEs and EPC 130, which are known as the Non-Access Stratum (NAS) protocols. The S-GW handles all Internet Protocol (IP) data packets (e.g., user plane, UP) between UEs and EPC 130, and serves as the local mobility anchor for the data bearers when a UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) that carries scheduling information for DL messages on PDSCH, and grants for UL transmission on PUSCH.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information, including HARQ acknowledgements, channel state information reports, etc. PRACH is used for random access preamble transmission.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers.

Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3 or 4) is known as the Control Format Indicator (CFI) indicated by the PCFICH transmitted in the first symbol of the control region.

A dual connectivity framework was defined in LTE Release 12. Dual connectivity (or DC) refers to a mode of operation in which a UE, in RRC_CONNECTED state, consumes radio resources provided by at least two different network points connected to one another with a non-ideal backhaul. In the LTE standards, these two network points may be referred to as a "Master eNB" (MeNB) and a "Secondary eNB" (SeNB). More generally, they can be referred to as a master node (MN) and a secondary node (SN). DC can be viewed as a special case of carrier aggregation (CA), where the aggregated carriers, or cells, are provided by network nodes that are physically separated from one another and that are not connected to one another through a fast, quality, connection.

In DC, a UE is configured with a Master Cell Group (MCG) and a Secondary Cell Group (SCG). In general, a Cell Group (CG) is a group of serving cells associated with either the MeNB or the SeNB(s). More specifically, MCG is a group of serving cells associated with the MeNB, comprising a primary cell (PCell) and optionally one or more secondary cells (SCells). Similarly, SCG is a group of serving cells associated with the SeNB comprising a Primary SCell (pSCell) and optionally one or more SCells.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

One of the solutions for low latency data transmission is shorter transmission time intervals. For NR, in addition to transmission in a slot (such as for LTE, discussed above), a mini-slot transmission is also allowed to reduce latency. A mini-slot may consist of any number of 1 to 14 OFDM symbols. It should be noted that the concepts of slot and mini-slot are not specific to a specific service meaning that a mini-slot may be used for either eMBB, URLLC, or other services.

Recently, there has been a significant interest in deployment of satellite communications. Several plans for satellite networks have been announced in the past few years. The target services vary including backhaul and fixed wireless, transportation, outdoor mobile, and IoT, just to name a few. For example, satellite networks can be used to complement terrestrial networks (e.g., LTE and NR networks) by providing connectivity to underserved areas and multicast/broadcast services.

To benefit from the strong cellular ecosystem and large economy of scale, adapting terrestrial wireless access technologies (e.g., LTE and/or NR) for satellite networks is drawing significant interest. For example, 3GPP completed an initial study in Rel-15 on adapting NR to support non-terrestrial networks (mainly satellite networks). This initial study focused on defining the channel model for the non-terrestrial networks, defining deployment scenarios, and identifying the key potential impacts. 3GPP is conducting a follow-up study item in Rel-16 to evaluate solutions for NR to support non-terrestrial networks.

Depending on the orbit altitude, a satellite may be categorized as low Earth orbit (LEO), medium Earth orbit (MEO), or geostationary (GEO) satellite. In general, typical LEO heights range from 250-1,500 km, with orbital periods ranging from 90-130 minutes. Typical MEO heights range from 5,000-25,000 km, with orbital periods ranging from 2-14 hours. Finally, typical GEO height is about 35,786 km, with an orbital period of 24 hours.

In general, gateways are used to connect satellites to ground networks. As a non-GEO satellite is connected to different gateways at different times. In other words, as the non-GEO satellite's position changes relative to the earth's surface, the satellite's gateway also changes while UE connections to the satellite are maintained (e.g., via the changing gateways). This scenario is also referred to as a "moving RAN." There are several issues related to radio link monitoring performed during the switch, which can be inaccurate, misleading, and/or trigger unnecessary chain of events resulting in radio link failure (RLF).

SUMMARY

Embodiments of the present disclosure provide specific improvements to communication between user equipment (UE) and network nodes in a combined terrestrial and satellite wireless communication network, such as by facilitating solutions to overcome the exemplary problems described above.

Some exemplary embodiments of the present disclosure include methods (e.g., procedures) for performing radio link monitoring (RLM) in a combined terrestrial and satellite wireless communication network. The exemplary methods can be performed by a user equipment (e.g., UE, wireless device, MTC device, NB-IoT device, modem, etc. or component thereof) in communication with a terrestrial network node (TNN, e.g., base station, eNB, gNB, etc., or components thereof) via a satellite.

These exemplary methods can include, during a discontinuity in a connection between the UE and a terrestrial network node (TNN, e.g., in the combined satellite and terrestrial wireless communication network), performing RLM of the connection based on a second configuration. The connection can include a first link between the UE and a satellite and a second link between the satellite and the TNN. The discontinuity includes a link switch in at least one of the first link and the second link. These exemplary methods can also include the performing RLM of the connection based on a first configuration (e.g., differing from the second configuration in some manner) before and/or after the discontinuity.

In some embodiments, these exemplary methods can also include receiving, from the TNN via the connection, configuration information including the first configuration and the second configuration. In some embodiments, these exemplary methods can also include receiving, from the TNN while the discontinuity is pending, information related to the discontinuity. In some embodiments, the information related to the discontinuity can include a duration and/or a periodicity associated with at least one of the following: the link switch, and use of the second configuration. In some embodiments, performing RLM based on the second configuration is done only during the duration (e.g., according to the information received).

In some embodiments, the information related to the discontinuity can include an indication of whether to use the first configuration or the second configuration during the link switch. In such embodiments, performing RLM based on the second configuration can be based on the first configuration or the second configuration according to the indication. In some embodiments, the information related to the discontinuity can include at least a portion of the second configuration. For example, the at least a portion of the second configuration can include an indication of a phase change of a reference signal (RS), transmitted by the satellite, that is associated with the first and second configurations.

In various embodiments, performing RLM of the connection before, during, and after the discontinuity can include various operations. For example, performing RLM of the connection before the discontinuity based on the first configuration can include at least one of the following first operations0:

monitoring a physical downlink control channel (PDCCH) transmitted by the satellite;
measuring of one or more reference signals (RS) transmitted by the satellite;
determining an average of a plurality of the measurements of the RS;
detecting in-sync (IS) and out-of-sync (OOS) conditions based on a plurality of the measurements or a plurality of the averages of the measurements;
counting consecutive detections of IS conditions;
counting consecutive detections of OOS conditions;
initiating a radio link failure (RLF) timer after a predetermined number of consecutive OOS conditions;
detecting a beam failure based on a plurality of the RS measurements or a plurality of the averages of the RS measurements; and
initiating a link recovery procedure after expiration of the RLF timer or after detecting a beam failure.

Similarly, performing RLM of the connection during the discontinuity based on the second configuration can include at least one of the following second operations:

refraining from initiating one or more first operations;
stopping one or more first operations that were initiated or ongoing before the discontinuity;
restarting one or more first operations based on a new initial state;
continuing one or more first operations based on states of the respective first operations before the discontinuity; and
performing a cell reselection.

Similarly, performing RLM of the connection after the discontinuity based on the first configuration can include at least one of the following third operations:

resuming one or more first operations, stopped during the discontinuity, based on states of the halted operations before the discontinuity;
restarting one or more first operations, stopped during the discontinuity, based on a new initial state; and
performing synchronization with the satellite after a predetermined re-synchronization window following the discontinuity;
receiving a beam failure recovery configuration from the TNN; and
receiving, from the TNN, a link recovery search space for monitoring the PDCCH transmitted by the satellite.

In some embodiments, performing RLM of the connection after the discontinuity based on the first configuration can also include monitoring the PDCCH transmitted by the satellite based on one of the following:

a link recovery search space received from the TNN after the discontinuity; or
if no link recovery search space is received after the discontinuity, a link recovery search space configured before the discontinuity.

Other exemplary embodiments of the present disclosure include methods (e.g., procedures) for facilitating radio link monitoring (RLM) by a user equipment (UE) in a combined terrestrial and satellite wireless communication network. These exemplary methods can be performed by a terrestrial network node (TNN, e.g., base station, eNB, gNB, etc., or component thereof) in communication with one or more user equipment (e.g., UE, wireless device, MTC device, NB-IoT device, modem, etc. or component thereof) via a satellite.

The exemplary method can include transmitting configuration information to the UE via connection. For example, the configuration information can include a second configuration for RLM of the connection during a discontinuity in the connection, and a first configuration for RLM of the connection before and/or after the discontinuity. The first configuration can differ from the second configuration in some manner. The connection can include a first link between the UE and a satellite and a second link between the satellite and the TNN. The discontinuity can include a link switch in the first link and/or the second link.

The exemplary method can also include o determining that a discontinuity in the connection is pending. The exemplary method can also include transmitting, to the UE while the discontinuity is pending, information related to the discontinuity. In some embodiments, the exemplary method can also include transmitting to the UE after the discontinuity, one or more of the following: a beam failure recovery configuration; and a link recovery search space for monitoring a physical downlink control channel (PDCCH) transmitted by the satellite.

In some embodiments, the information related to the discontinuity can include a duration and/or a periodicity associated with at least one of the following: the link switch, and use of the second configuration. In some embodiments, the information related to the discontinuity can include an indication of whether to use the first configuration or the second configuration during the link switch. In some embodiments, the information related to the discontinuity can include at least a portion of the second configuration. For example, the at least a portion of the second configuration can include an indication of a phase change of a reference signal (RS), transmitted by the satellite, that is associated with the first and second configurations.

In various embodiments, the first configuration can be related to at least one of the following first operations by the UE before the discontinuity:

monitoring a physical downlink control channel (PDCCH) transmitted by the satellite;
measuring of one or more reference signals (RS) transmitted by the satellite;

determining an average of a plurality of the measurements of the RS;

detecting in-sync (IS) and out-of-sync (OOS) conditions based on a plurality of the measurements or a plurality of the averages of the measurements;

counting consecutive detections of IS conditions;

counting consecutive detections of OOS conditions;

initiating a radio link failure (RLF) timer after a predetermined number of consecutive OOS conditions; and detecting a beam failure based on a plurality of the RS measurements or a plurality of the averages of the RS measurements; and initiating a link recovery procedure after expiration of the RLF timer or after detecting a beam failure.

In various embodiments, the second configuration can be related to at least one of the following second operations by the UE during the discontinuity:

refraining from initiating one or more of the first operations;

stopping one or more first operations that were initiated or ongoing before the discontinuity;

restarting one or more of the first operations based on a new initial state;

continuing one or more of the first operations based on states of the respective operations before the discontinuity; and performing a cell reselection.

In various embodiments, the first configuration can be related to at least one of the following third operations by the UE after the discontinuity:

resuming one or more first operations, stopped during the discontinuity, based on states of the halted operations before the discontinuity;

restarting one or more first operations, stopped during the discontinuity, based on a new initial state;

synchronization with the satellite after a predetermined re-synchronization window following the discontinuity;

beam failure recovery;

link recovery; and

PDCCH monitoring.

Other exemplary embodiments include user equipment (UEs, e.g., wireless devices, MTC devices, NB-IoT devices, or components thereof, such as a modem) or terrestrial network nodes (TNNs, e.g., base stations, eNBs, gNBs, gateways, etc., or component thereof) configured to perform operations corresponding to any of the exemplary methods described herein. Other exemplary embodiments include non-transitory, computer-readable media storing program instructions that, when executed by processing circuitry, configure such UEs or TNNs to perform operations corresponding to the exemplary methods described herein.

These and other objects, features, benefits, and advantages of embodiments of the present disclosure will become apparent upon reading the following Detailed Description in view of the Drawings briefly described below.

BRIEF DESCRIPTION OF THE DRAWINGS

FIG. 8, which includes

DETAILED DESCRIPTION

Figure 1:
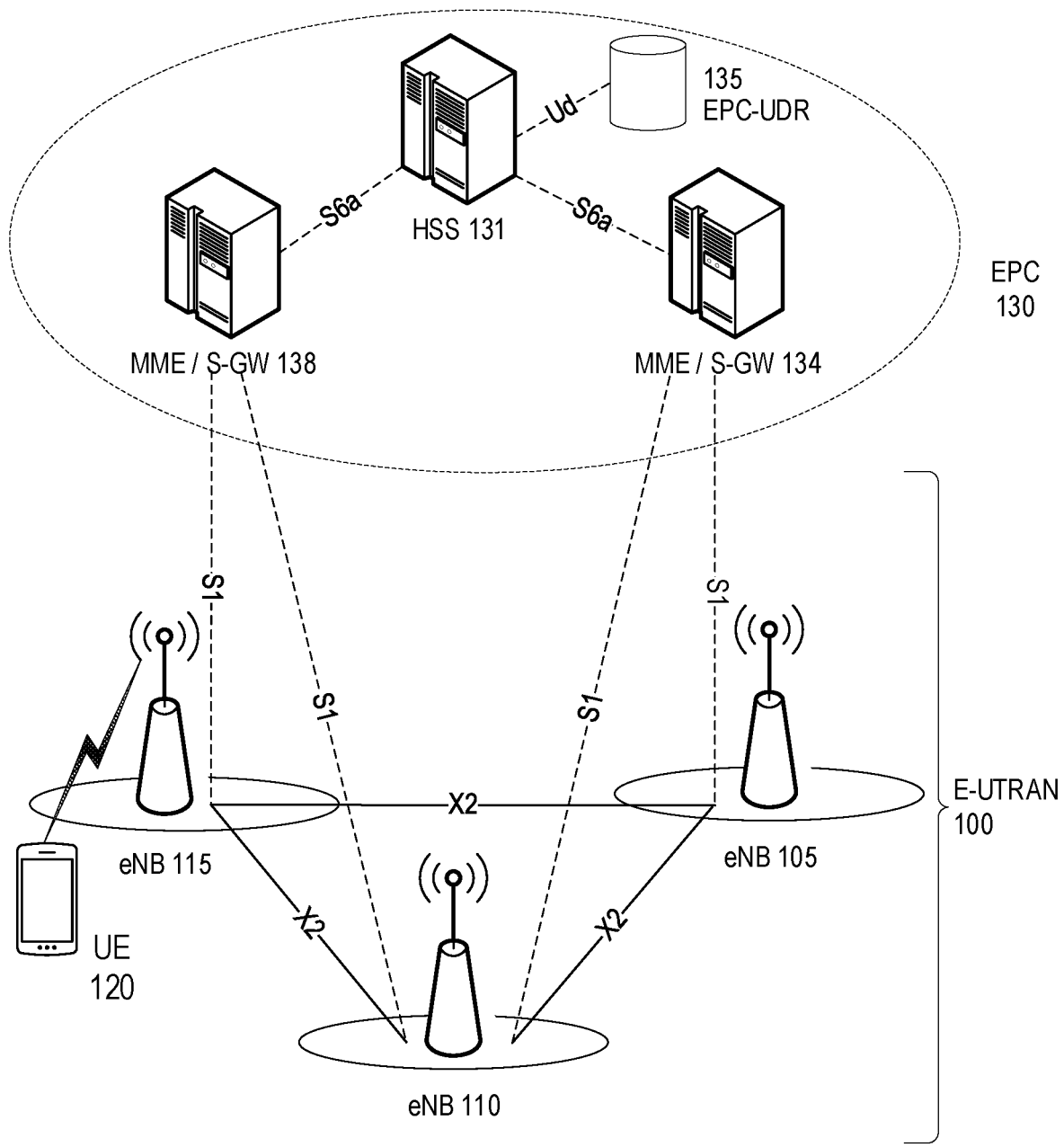
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
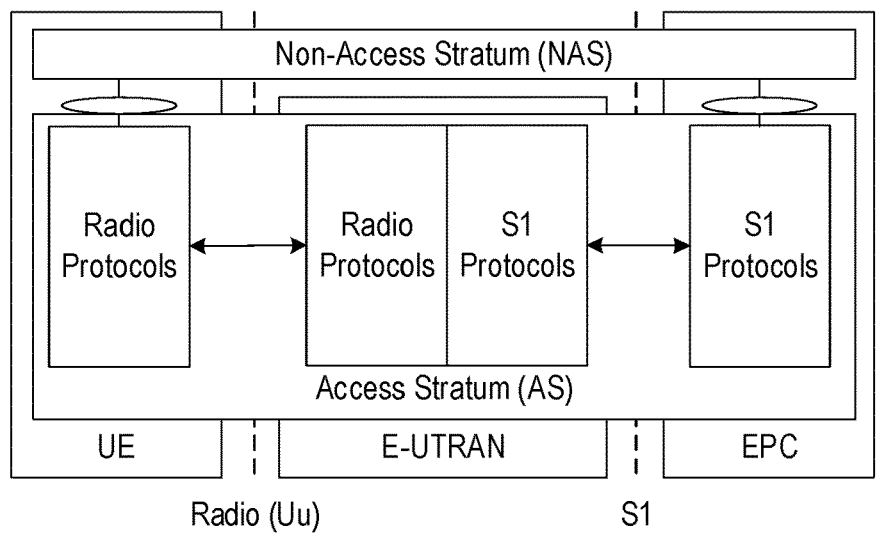
FIG. 2A is a high-level block diagram of an exemplary E-UTRAN architecture in terms of its constituent components, protocols, and interfaces.
Figure 2B:
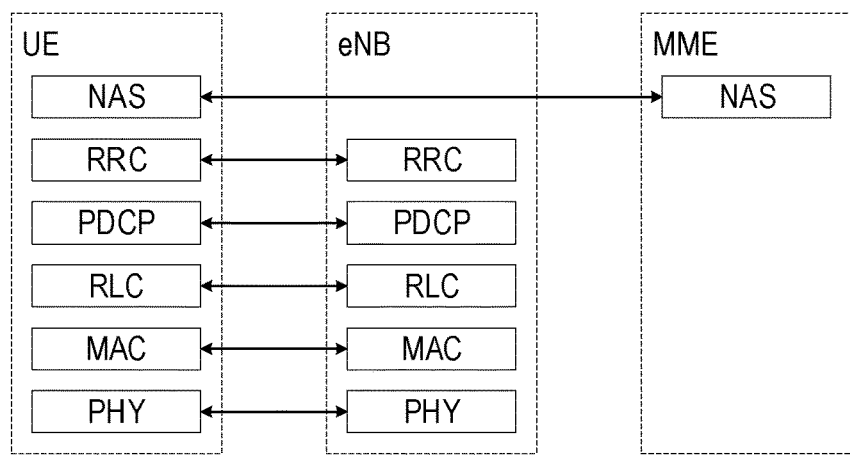
FIG. 2B is a block diagram of exemplary protocol layers of the control-plane portion of the radio (Uu) interface between a user equipment (UE) and the E-UTRAN.
Figure 2C:
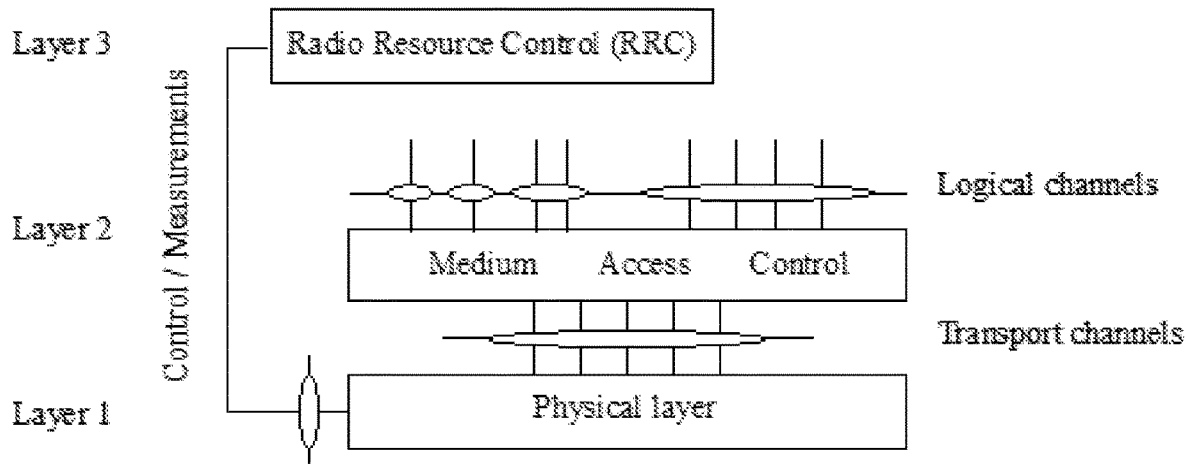
FIG. 2C is a block diagram of an exemplary LTE radio interface protocol architecture from the perspective of the PHY layer.
Figure 3A:
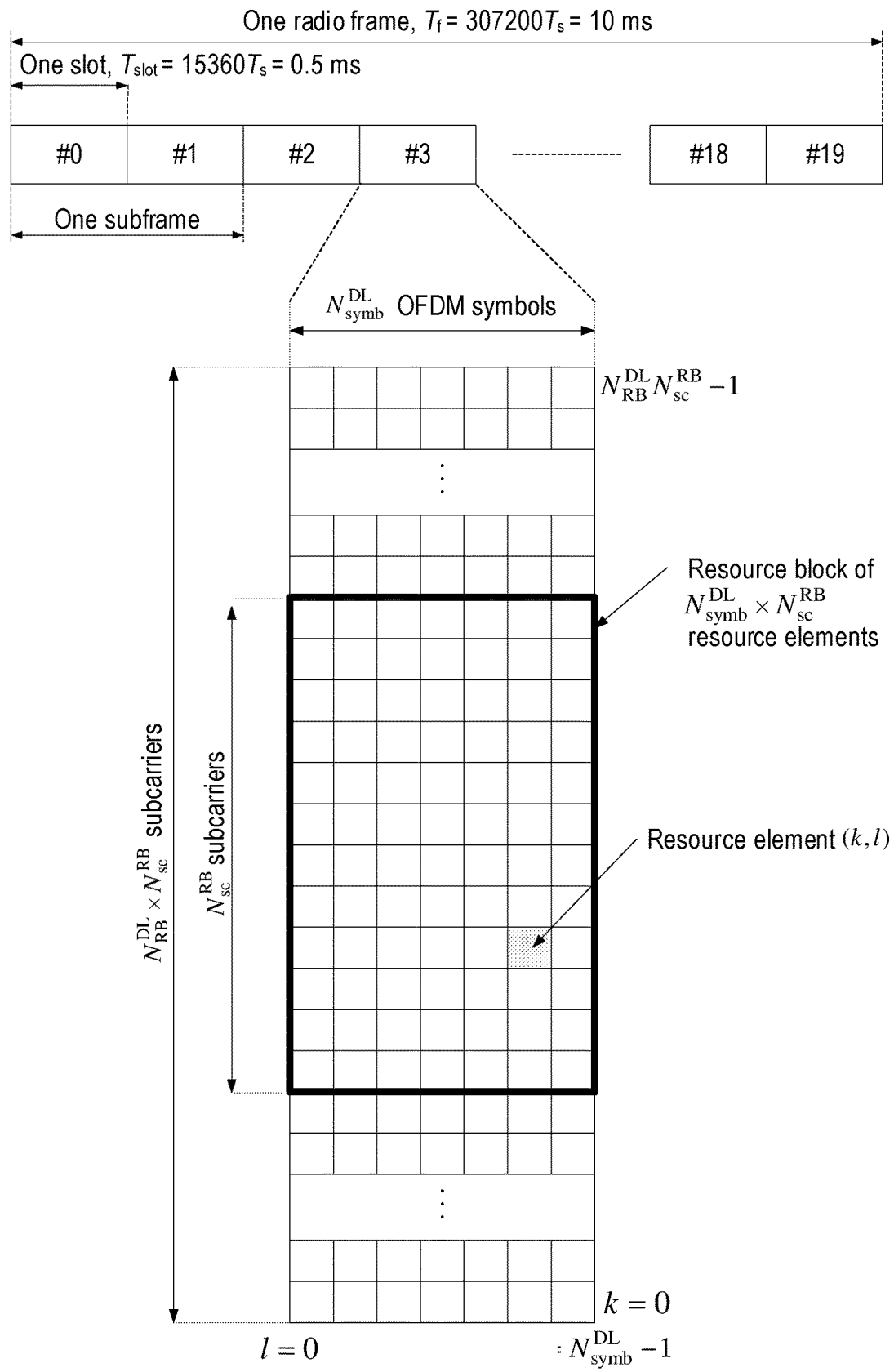
FIGS. 3A and 3B are block diagrams, respectively, of exemplary downlink and uplink LTE radio frame structures used for frequency division duplexing (FDD) operation.
Figure 3B:
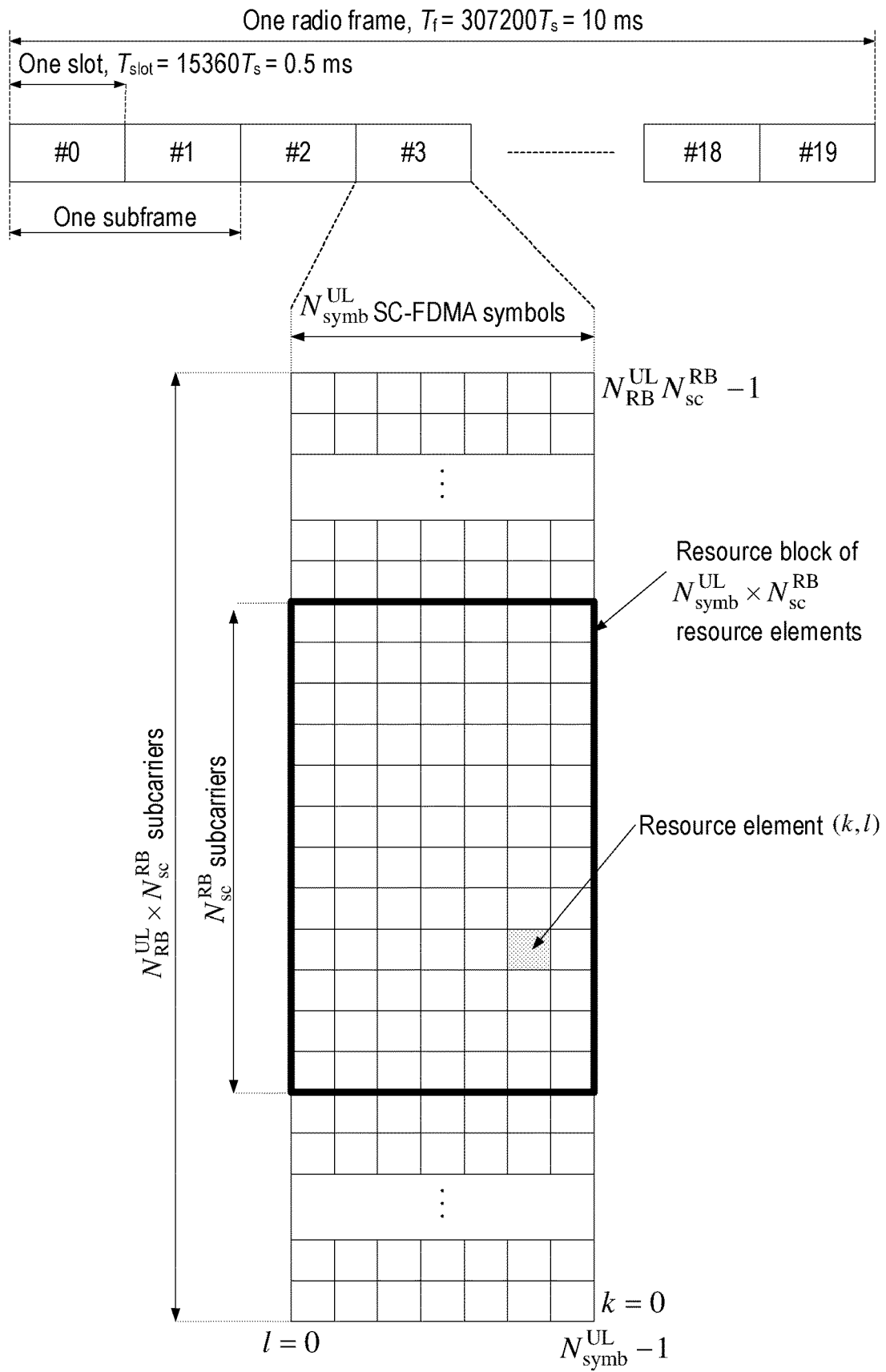

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or alternately "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), an integrated access backhaul (IAB) node, a relay node, a gateway, or a ground station. Radio access nodes can be part of a terrestrial RAN, a non-terrestrial RAN, or a combined terrestrial/non-terrestrial RAN.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network. Network nodes can be part of a terrestrial network (e.g., as a terrestrial network node, TNN), a non-terrestrial network (e.g., as a non-terrestrial network node, NTNN), or a combined terrestrial/non-terrestrial RAN (e.g., as either a TNN or NTNN).

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, as a non-GEO satellite's position changes relative to the earth's surface, the satellite's gateway also changes while UE connections to the satellite are maintained (e.g., via the changing gateways). This scenario is also referred to as a "moving RAN." There are several issues related to radio link monitoring performed during gateway changes (or "switches"), which can be inaccurate, misleading, and/or trigger unnecessary events resulting in radio link failure (RLF). This is discussed in more detail below.

Figure 4:
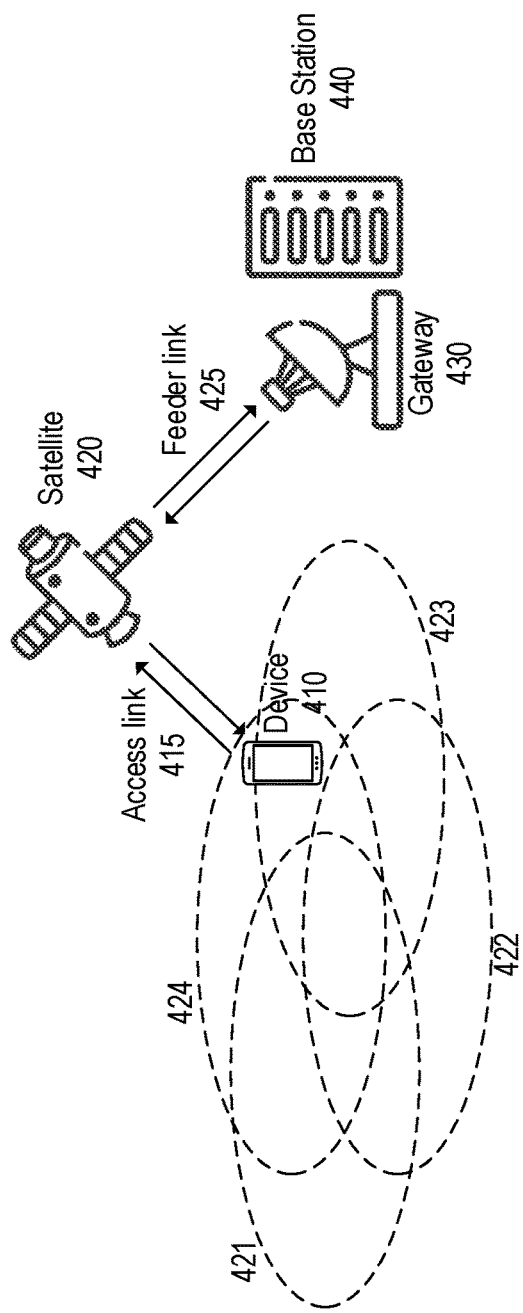
FIG. 4 shows a high-level view of an exemplary satellite radio access network (RAN), also referred to as a non-terrestrial network (NTN).

FIG. 4 shows a high-level view of an exemplary satellite radio access network (RAN), which is also referred to as a non-terrestrial network (NTN). The exemplary satellite RAN shown in FIG. 4 includes a space-borne platform, such as a satellite 420, and a gateway 430 that connects the satellite to an earth network, shown as a base station 440. The radio link 425 between the gateway 430 and the satellite 420 is referred to as a "feeder link," while the radio link 415 between the satellite 420 and a particular device (or UE) 410 is referred to as an "access link" (or "service link"). Furthermore, the combined link from gateway to device is often called the "forward link," and the combined link from device to gateway is often called the "return link" (or "reverse link").

A satellite typically generates several beams (also referred to as "spotbeams") over a given area. In the example shown in FIG. 4, satellite 420 generates respective spotbeams 421-424 over the area shown. The footprint of a beam is usually in an elliptic shape, which has been traditionally considered as a cell. The footprint of a beam may move over the earth's surface with the satellite movement or may be earth fixed with some beam pointing mechanism used by the satellite to compensate for its motion. The size of a spotbeam depends on the system design, which may range from tens of kilometers to a few thousands of kilometers. Even so, relative to beams observed in a terrestrial network, satellites spotbeams (e.g., spotbeams 1-4 in FIG. 4) can be very wide and extend beyond the area associated with a particular cell.

Depending on the functionality of the satellite in the system, there are generally two transponder options. First, with a bent pipe (or transparent) transponder, the satellite forwards the received signal back to the earth with only amplification and a shift between service link frequency and feeder link frequency. Second, with a regenerative transponder, the satellite includes on-board processing to demodulate and decode the received signal and regenerate the signal before sending it back to the earth.

In RAN #80, a new study item (SI) called "Solutions for NR to support Non Terrestrial Network (NTN)" was agreed. It is a continuation of the earlier Rel-15 study with objectives mentioned above, where the results are given in 3GPP TR 38.811 (v15.0.0). The objectives of the current SI are to evaluate solutions for the identified key impacts from the preceding SI and to study impact on RAN protocols/architecture. Results will be reported in 3GPP TR 38.821 (currently v0.1.0).

With respect to the physical layer (PHY), objectives of this current SI include consolidating potential impacts initially identified in 3GPP TR 38.811 (v15.0.0), as well as identifying related solutions, as needed, for the following:

Physical layer control procedures (e.g. CSI feedback, power control).

UL timing advance/RACH procedure including PRACH sequence/format/message.

Making retransmission mechanisms at the physical layer more delay-tolerant as appropriate. This may also include capability to deactivate the HARQ mechanisms.

Performance assessment of NR in selected deployment scenarios (LEO based satellite access, GEO based satellite access) through link level (Radio link) and system level (cell) simulations.

With respect to layer 2 and above, as well as RAN architecture, objectives of this current SI include studying the following aspects and identifying related solutions as needed:

Propagation delay: Identify timing requirements and solutions on layer 2 aspects, MAC, RLC, RRC, to support non-terrestrial network propagation delays considering FDD and TDD duplexing mode. This includes radio link management. [RAN2]

Handover: Study and identify mobility requirements and necessary measurements that may be needed for handovers between some non-terrestrial space-borne vehicles (such as Non Geo stationary satellites) that move at much higher speed but over predictable paths [RAN2, RAN1]

Architecture: Identify needs for the 5G's Radio Access Network architecture to support non-terrestrial networks (e.g. handling of network identities) [RAN3]

Paging: procedure adaptations in case of moving satellite footprints or cells

As mentioned above, in some scenarios, satellite spot-beams may be fixed or moving relative to the earth's surface. Some typical beam footprint sizes are given in Table 1 below, where "aerial" refers to an "aerial vehicle" (also called Unmanned Aircraft Systems, or UAS) having an altitude between 8 and 50 km:

TABLE 1

| Attributes | GEO | Non-GEO | Aerial |
|---|---|---|---|
| Beam footprint size in diameter | 200-1000 km | 100-500 km | 5-200 km |

Figure 5:
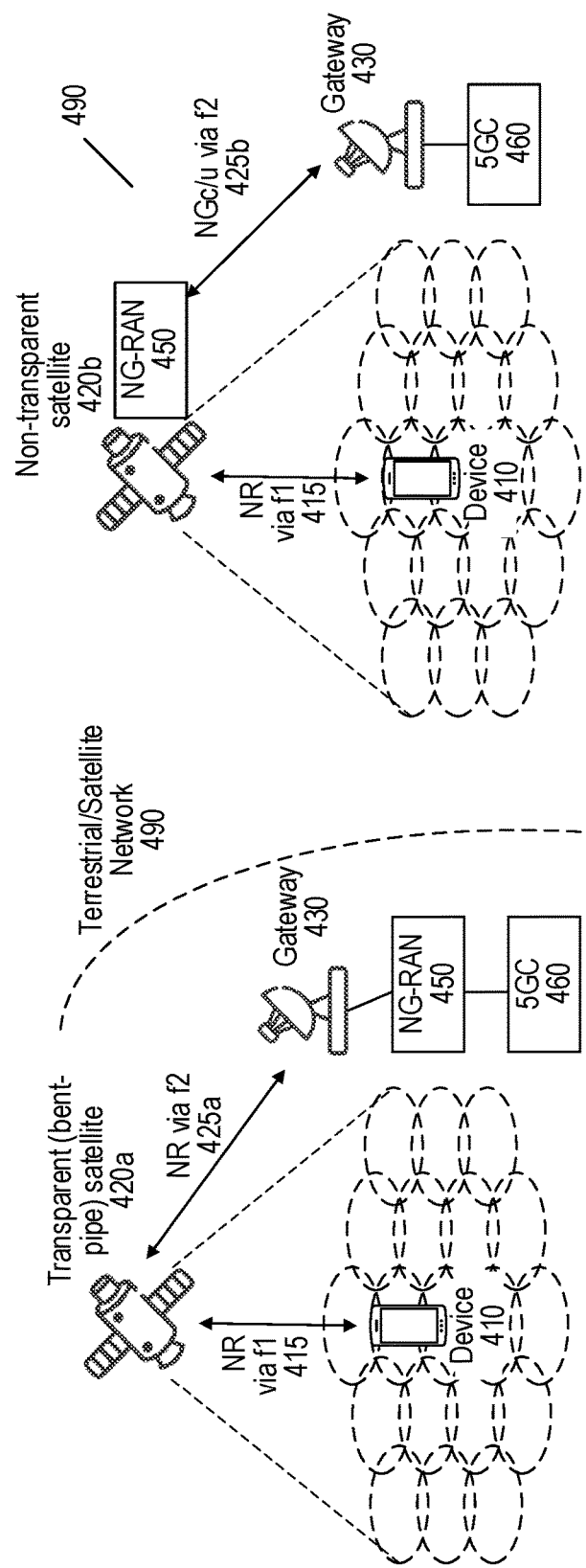
FIG. 5 shows a comparison of two exemplary integrations of an NTN with a 5G RAN (NG-RAN) and a 5G core network (5GC), according to various exemplary embodiments of the present disclosure.

FIG. 5 shows a comparison of two exemplary integrations of a NTN (e.g., satellite access network) with a 5G RAN (identified as NG-RAN 450) and a 5G core network (identified as 5GC 460), including exemplary beam patterns generated by the NTN. In FIG. 5, this integrated and/or combined network is identified as terrestrial/satellite network 490. Network 490 can include various components of the satellite RAN shown in FIG. 4, which are labelled with identical reference numbers in FIG. 5.

FIG. 5 illustrates two different variants of network 490. In the variant on the left, the satellite (identified as 420a) uses a transparent, bent-pipe transponder. In this case, the feeder link 425a can be the NR radio interface over a second frequency (f2), which the service link 415a can be the NR radio interface over a first frequency (f1).

In the variant on the right, the satellite (identified as 420b) uses a non-transparent transponder with on-board processing. In this variant, satellite 420b includes functionality typically found in a base station (e.g., gNB) of the NG-RAN, which is illustrated by showing NG-RAN 450 adjacent to satellite 420b. As such, feeder link 425b can carry the NG interface between 5GC 460 and NG-RAN 450 (including NGc control plane and NGu user plane) over f2.

3GPP TR 38.821 (v0.1.0) currently describes NTNs as typically including one or more gateways (also referred to as "sat-gateways") that connect the NTN to a public data network. For example, a GEO satellite is served by one or several sat-gateways deployed across the satellite targeted coverage (e.g., regional or even continental coverage). Even so, it is assumed that UEs in a single cell are served by a single sat-gateway. Similarly, a Non-GEO satellite is served successively by one sat-gateway at a time. The system ensures service and feeder link continuity between the successive serving sat-gateways with sufficient duration for mobility anchoring and handover.

3GPP TR 38.821 (v0.1.0) considers four reference scenarios, which are summarized in Table 2 below with further details given in following Table 3:

TABLE 2

Reference scenarios.

|  | Transparent satellite | Regenerative satellite |
|---|---|---|
| GEO based non-terrestrial access network | Scenario A | Scenario B |
| LEO based non-terrestrial access network | Scenario C | Scenario D |

TABLE 3

Reference scenario parameters.

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Max channel bandwidth (service link) | 30 MHz for band <6 GHz<br>400 MHz for band >6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |

TABLE 3-continued

Reference scenario parameters.

| Scenarios | GEO based non-terrestrial access network (Scenario A and B) | LEO based non-terrestrial access network (Scenario C & D) |
|---|---|---|
| Inter-Satellite link | No | Scenario C: No<br>Scenario D: Yes |
| Earth-fixed beams | Yes | Scenario C: No (the beams move with the satellite)<br>Scenario D, option 1: Yes (steering beams), see note 1<br>Scenario D, option 2: No (the beams move with the satellite) |
| Max beam footprint diameter at nadir | 500 km | 200 km |
| Min Elevation angle for both sat-gateway and user equipment | 10° | 10° |
| Max distance between satellite and user equipment at min elevation angle | 40,586 km | 1,932 km (600 km altitude)<br>3,131 km (1,200 km altitude) |
| Max Round Trip Delay (propagation delay only) | Scenario A: 562 ms (service and feeder links)<br>Scenario B: 281 ms | Scenario C: 25.76 ms (transparent payload: service and feeder links)<br>Scenario D: 12.88 ms (regenerative payload: service link only) |
| Max delay variation within a beam (earth fixed user equipment) | 16 ms | 4.44 ms (600 km)<br>6.44 ms (1200 km) |
| Max differential delay within a beam | 1.6 ms | 0.65 ms (*) |
| Max Doppler shift (earth fixed user equipment) | 0.93 ppm | 24 ppm (*) |
| Max Doppler shift variation (earth fixed user equipment) | 0.000 045 ppm/s | 0.27 ppm/s (*) |
| User equipment motion on the earth | 1000 km/h (e.g. aircraft) | 500 km/h (e.g. high speed train)<br>Possibly 1000 km/h (e.g. aircraft) |
| User equipment antenna types | Omnidirectional antenna (linear polarisation), assuming 0 dBi<br>Directive antenna (up to 60 cm equivalent aperture diameter in circular polarisation) | |
| User equipment Tx power | Omnidirectional antenna: UE power class 3 with up to 200 mW<br>Directive antenna: up to 4 W | |
| User equipment Noise figure | Omnidirectional antenna: 7 dB<br>Directive antenna: 1.2 dB | |
| Service link | 3GPP defined New Radio | |
| Feeder link | 3GPP or non-3GPP defined Radio interface | 3GPP or non-3GPP defined Radio interface |

In addition, the following notes apply to Table 3 above:
Each satellite has the capability to steer beams towards fixed points on earth using beamforming techniques. This is applicable for a period of time corresponding to the visibility time of the satellite.
Max delay variation within a beam (earth fixed user equipment) is calculated based on in Elevation angle for both gateway and user equipment.
Max differential delay within a beam is calculated based on Max beam footprint diameter at nadir.

For scenario D, which is LEO with regenerative payload, both earth-fixed and earth moving beams have been listed, which correspond to two different scenarios. Accordingly, the complete list of five scenarios in 3GPP TR 38.821 (v0.1.0) is then:
Scenario A—GEO, transparent satellite, Earth-fixed beams;
Scenario B—GEO, regenerative satellite, Earth fixed beams;
Scenario C—LEO, transparent satellite, Earth-moving beams;
Scenario D1—LEO, regenerative satellite, Earth-fixed beams;
Scenario D2—LEO, regenerative satellite, Earth-moving beams.

When NR or LTE is applied to provide the connectivity via satellites, it means that the ground station is a RAN node. In the case where the satellite transponder is transparent (or bent-pipe), all RAN functionalities are on the ground. This means that the sat-gateway should have complete eNB and/or gNB functionality. On the other hand, for regenerative transponders, part or all of the eNB and/or gNB functionality may be on the satellite rather than on the ground.

Non-GEO satellites move rapidly with respect to any given UE location. As an example, on a 2-hour orbit, a LEO satellite is in view of a stationary UE from horizon to horizon for only about 20 minutes. Since each LEO satellite may have many beams, the time during which a UE stays within a beam is typically only a few minutes. The fast pace of satellite movement creates problems for mobile terminated reachability (i.e., paging), mobile originated reachability (i.e., random access) as well as idle and connected mode mobility (i.e., handovers) for a stationary UE as well as a moving UE.

Unlike a terrestrial network in which a cell on the ground is tied to radio communication with a RAN, the satellite beams in a non-GEO satellite access network may be moving. In other words, there is no fixed correspondence between cells on the ground and satellite beams. The same geographical region on the ground can be covered by different satellites and different beams over time. As an example, when one LEO satellite's beam moves away from a geographical area, another LEO beam (generated by the same or by a neighboring LEO satellite) comes in to cover the same geographical area. If the new LEO beam is generated by a different satellite, this new satellite may be served by the same or a different sat-gateway than the satellite whose beam previously covered the geographical area. Since the sat-gateway is the serving RAN node from a UE's perspective, such a change in serving spotbeams can result in a change in serving RAN nodes, even if the UE is stationary. A similar situation occurs when the serving satellite changes, even if it is connected to the same sat-gateway.

This situation is not present in conventional terrestrial networks, such as LTE or NR cellular networks. As such, it can create problems for the integration of satellite and terrestrial LTE and/or NR networks, such as problems related to a UE's radio link monitoring (RLM) of cells and/or beams in such an integrated network.

The principle of RLM is similar in LTE and NR. The purpose is to monitor the radio link quality of the UE's serving cell and use that information to decide whether the UE is in-sync (IS) or out-of-sync (OOS) with respect to that serving cell. In LTE, RLM is carried out by UE measuring downlink reference signals (e.g., CRS) in RRC_CONNECTED state. If RLM indicates number of consecutive OOS conditions, then the UE starts a radio link failure (RLF) procedure and declares RLF after expiry of a timer (e.g., T310). The actual procedure is carried out by comparing the estimated CRS measurements to some target block error rates (BLERs), called Qout and Qin. In particular, Qout and Qin correspond to BLER of hypothetical PDCCH/PCIFCH transmissions from the serving cell, with exemplary values of 10% and 2%, respectively. In NR, the network can define the RS type (e.g., CSI-RS and/or SSB), exact resources to be monitored, and even the BLER target for IS and OOS indications.

Figure 6:
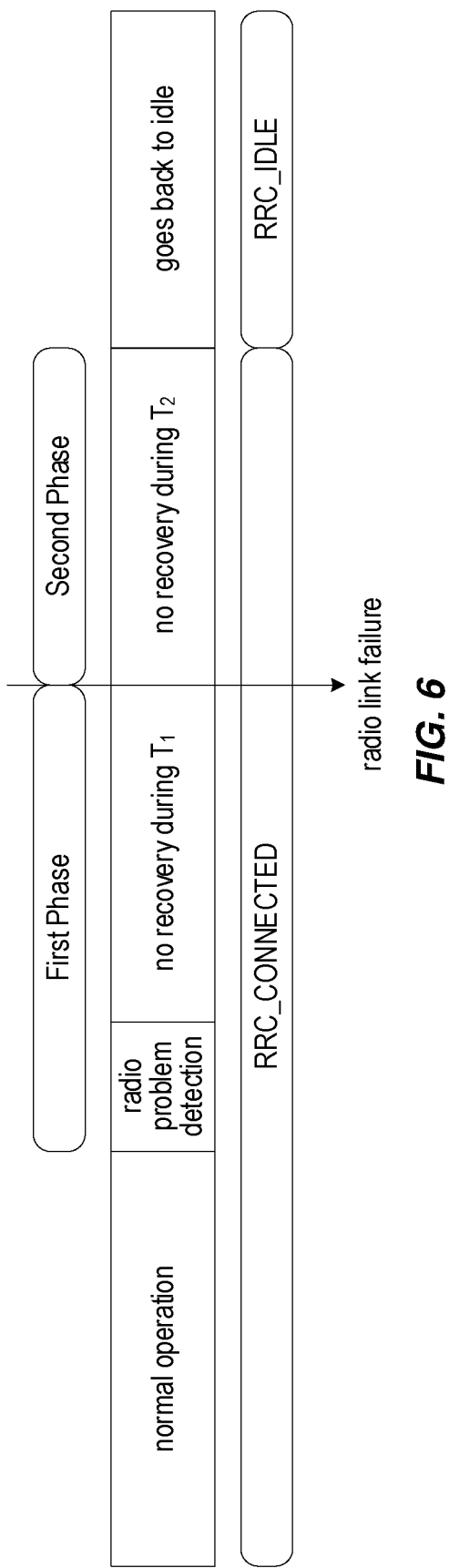
FIG. 6 shows a high-level timing diagram illustrating two phases of an exemplary radio link failure (RLF) procedure in LTE and NR, according to various exemplary embodiments of the present disclosure.

FIG. 6 shows a high-level timing diagram illustrating the two phases of a RLF procedure in LTE and NR. The first phase starts upon radio problem detection and leads to radio link failure detection. The second phase (RRC recovery) starts upon radio link failure detection or handover failure and leads to RRC_IDLE in case the RRC recovery fails.

For single-carrier and CA scenarios, re-establishment is triggered when the PCell experiences RLF. The UE does not monitor the RLF of SCells, which instead is monitored by the eNB. In LTE, for Dual Connectivity (DC), the first phase of the RLF procedure is supported for PCell and PSCell. Re-establishment is triggered when PCell experiences RLF. However, upon detecting RLF on the PSCell, the re-establishment procedure is not triggered at the end of the first phase. Instead, the UE informs the master eNB (MeNB) of the RLF of the PSCell.

RLF can be triggered by layer 1 (L1, e.g., physical layer (PHY)) or layer 2 (L2, e.g., medium access control layer (MAC) or radio link control (RLC)), which is then reported to layer 3 (L3, e.g., RRC). The RLM procedure is responsible for L1-triggering, upon receiving a number (N310) of consecutive OOS indications from lower layers without recovery (i.e., no reported IS). L2-triggering may be based upon indication from RLC that the maximum number of retransmissions has been reached, or upon random access problem indication from MAC. This is summarized in Table 4 below:

TABLE 4

| T310 NOTE1 NOTE2 | Upon detecting physical layer problems for the PCell i.e. upon receiving N310 consecutive out-of-sync indications from lower layers | Upon receiving N311 consecutive in-sync indications from lower layers for the PCell, upon triggering the handover procedure and upon initiating the connection re-establishment procedure | If security is not activated: go to RRC_IDLE else: initiate the connection re-establishment procedure |
|---|---|---|---|
| T311 NOTE1 | Upon initiating the RRC connection re-establishment procedure | Selection of a suitable E-UTRA cell or a cell using another RAT. | Enter RRC_IDLE |
| T312 NOTE2 | Upon triggering a measurement report for a measurement identity for which T312 has been configured, while T310 is running | Upon receiving N311 consecutive in-sync indications from lower layers, upon triggering the handover procedure, upon initiating the connection re-establishment procedure, and upon the expiry of T310 | If security is not activated: go to RRC_IDLE else: initiate the connection re-establishment procedure |
| T313 NOTE2 | Upon detecting physical layer problems for the PSCell i.e. upon receiving N313 consecutive out-of-sync indications from lower layers | Upon receiving N314 consecutive in-sync indications from lower layers for the PSCell, upon initiating the connection re-establishment procedure, upon SCG release and upon receiving RRCConnectionReconfiguration including MobilityControlInfoSCG | Inform E-UTRAN about the SCG radio link failure by initiating the SCG failure information procedure as specified in 5.6.13. |

The following points summarize RLM for LTE, described in 3GPP TS 36.213 (v15.3.0). A corresponding overview of RLM for NR is in 3GPP TS 38.213 (v15.3.0) § 5.

- The downlink radio link quality of the primary cell shall be monitored by the UE for the purpose of indicating out-of-sync/in-sync status to higher layers.
- If the UE is configured with a SCG and the parameter rlf-TimersAndConstantsSCG is provided by the higher layers and is not set to release, the downlink radio link quality of the PSCell [4, i.e., 3GPP TS 36.331 v15.3.0]

of the SCG shall be monitored by the UE for the purpose of indicating out-of-sync/in-sync status to higher layers.

In non-DRX mode, the physical layer in the UE shall every radio frame assess the radio link quality, evaluated over a previous time period defined in 3GPP TS 36.113 (v15.2.0) against thresholds ($Q_{out}$ and $Q_{in}$) according to relevant tests (also defined in 3GPP TS 36.113).

In DRX mode, the physical layer in the UE shall at least once every DRX period assess the radio link quality, evaluated over the previous time period defined in 3GPP TS 36.113, against thresholds ($Q_{out}$ and $Q_{in}$) according to relevant tests (also defined in 3GPP TS 36.113).

If higher-layer signalling indicates certain subframes for restricted radio link monitoring, the radio link quality shall not be monitored in any subframe other than those indicated.

The physical layer in the UE shall in radio frames where the radio link quality is assessed indicate out-of-sync to higher layers when the radio link quality is worse than the threshold $Q_{out}$. When the radio link quality is better than the threshold $Q_{in}$, the physical layer in the UE shall in radio frames where the radio link quality is assessed indicate in-sync to higher layers.

In addition to monitoring for RLF, UEs also monitor the radio link quality of a serving cell based on certain DL RS (e.g., for NR, SSB or periodic CSI-RS). More specifically, on each RS resource in the set $\bar{q}_0$, the UE estimates the radio link quality and compares it to the threshold $Q_{out\_LR}$. This threshold is a level at which the UE cannot reliably receive the DL, and corresponds to a block error rate ($BLER_{out}$) of a hypothetical PDCCH transmission. A quality level below the threshold for a predetermined duration (e.g., $T_{Evaluate\_BFD}$) constitutes "beam failure." When the radio link quality on all configured RS resources in $\bar{q}_0$ is worse than $Q_{out\_LR}$, the UE layer-1 sends a beam failure indication for the cell to the UE higher layers.

After detecting beam failure, the UE can initiate beam failure recovery and link recovery. In these recovery procedures, the UE performs reference signal received power (RSRP) measurements on each RS resource in the set $\bar{q}_1$, and compares the measurements to a threshold $Q_{in\_LR}$ for selecting new beam(s) for recovery. The UE can then perform random-access towards the new beam(s) as part of the link recovery. Beam failure detection and beam/link recovery procedures are further defined in 3GPP TS 38.133 (v15.3.0).

Figure 7:
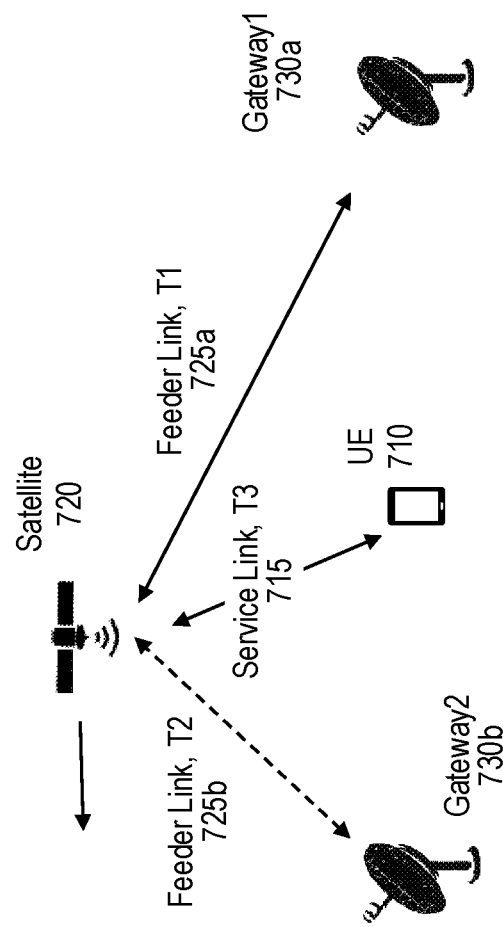
FIG. 7 shows an exemplary scenario in which a non-stationary (e.g., non-GEO) satellite changes satellite gateways (e.g., ground stations) over time due to the satellite's motion in orbit, according to various exemplary embodiments of the present disclosure.

FIG. 7 shows an exemplary scenario in which a non-GEO satellite 720 changes sat-gateways over time due to the satellite's motion in orbit (i.e., relative to the earth's surface). As shown in FIG. 7, the satellite initially is connected to Gateway1 (identified as 730a), which serves as the satellite's ground station. Gateway1 can be part of a terrestrial RAN, such as an LTE and/or NR RAN. The feeder link 725a between the satellite 720 and Gateway1 730a can have a propagation delay T1. The satellite also maintains a service link 715 with UE 710. Service link 715 has a propagation delay T3. In other words, the UE can maintain a connection to the terrestrial RAN that includes two links: service link 715 to the satellite 720 (e.g., with delay T3) and a feeder link 725a between the satellite 720 and the RAN (e.g., with delay T1).

Subsequently, as the satellite moves out of range of Gateway1 730a, it establishes a new feeder link connection with Gateway2 730b, which then serves as the satellite's new ground station. Gateway2 can be part of the same terrestrial RAN as Gateway1, or part a different terrestrial RAN. The connection between satellite 720 and Gateway2 730b can be via feeder link 725b, which can have a propagation delay of T2 that is different than T1. During the link switch of the satellite connection from the Gateway1 to Gateway2, there will be an idle period or at least a discontinuity of the satellite transmission. RLM performed during the link switch may be inaccurate or misleading, which may trigger an unnecessary chain of events resulting in RLF.

Accordingly, exemplary embodiments of the present disclosure provide novel, flexible, and efficient techniques for adapting RLM procedures during the switch of a satellite service (or access) link and/or a satellite feeder link, referred to generically as "link switch." In general, by configuring or specifying UE behavior in accordance with the link switch, exemplary embodiments mitigate the effects of spurious measurements that can be inaccurate or misleading, and/or can result in undesired actions being taken by the satellite and/or the terrestrial RAN. Furthermore, configuring or specifying UE behavior in this manner (e.g., to forego measurements during satellite idle periods) can reduce UE energy consumption and increase UE battery life.

For both RLF detection and beam failure detection, the UE can monitor preconfigured DL RS. If the quality of the monitored RS is below (or above) a configured threshold for an amount of time (e.g., configured by higher layers, such as RRC), the UE layer-1 can send an OOS (or IS) indication to higher layers. Similarly, the UE can send a beam failure indication to higher layers, as discussed above. If the higher layers receive a configurable number of consecutive OOS indication from lower layers, the higher layers initiate (or terminate) the RLF procedure. Likewise, the higher layers can subsequently terminate (or initiate) the RLF procedure upon reception of a configurable number of consecutive IS (or OOS) indications.

In various embodiments, the UE can be configured with different RLM-related parameters, behavior, and/or mechanisms to use during the link switch (e.g., in a period of discontinuity), as compared to before/after the link switch. Alternately, some or all of such parameters, behavior, and/or mechanisms can be preconfigured (e.g., in a 3GPP specification) such that no explicit configuration is necessary. For example, the following RLM-related parameters and/or mechanisms can be configured or preconfigured for use in relation to the link switch:

UE stops averaging the RS quality (e.g., for determining IS/OOS or beam failure) when the switch happens;
UE restarts the averaging of the RS quality after the switch (i.e., after the period of discontinuity);
UE continues averaging of the RS quality after the switch;
UE restarts the counter for OOS and/or IS when the switch occurs;
UE continues same count of OOS/IS during the switch (i.e., during the period of discontinuity);
If RLF timer is running when the switch happens, the UE can:
  Stop timer and restart (e.g., assuming 0 OOS initial state);
  Stop timer and restart after the switch (e.g., assuming 0 OOS initial state);
  Pause (or halt) timer and resume after the switch; and/or
  Continue timer during the switch (i.e., without regard to the switch).

In some embodiments, the network (e.g., the LTE and/or NR RAN) can indicate to the UE when and/or where to activate switch-specific, RLM-related parameters, behavior, and/or mechanisms, such as those listed above. The network can provide such an indication in various ways, such as downlink control information (DCI), MAC-layer control elements (CE), and/or RRC signaling. In addition, the indication can include and/or be associated with various information, such as the following:

- Bit indication whether to activate/deactivate switch-specific RLM;
- Periodicity and duration of the switch and/or switch-specific RLM, where duration could be signaled as a number of NR slots or an absolute time (e.g., seconds);
- Configuration of switch-specific RLM (e.g., updated RLM configuration);
- RLM resource restriction (e.g., to stop or limit RLM monitoring during switch); and
- Anticipated RS phase change. It is possible that the service link remains the same while the feeder link changes. This may result in a phase change for the reference signals (e.g., SSB or CSI-RS) used for measurement. The network may calculate and update the UE with such a phase change.

As mentioned above, after detecting beam failure, a UE can initiate a link recovery procedure, which can include beam failure recovery. In some embodiments, the UE can be configured with different recovery-related parameters, behavior, and/or mechanisms to use during the link switch, as compared to before/after the link switch. This can be done as an alternative, or in addition, to the configuration of various RLM-related parameters, behavior, and/or mechanisms, discussed above. Alternately, some or all of the recovery-related parameters, behavior, and/or mechanisms can be preconfigured (e.g., in a 3GPP specification) such that no explicit configuration is necessary. For example, the following recovery-related parameters and/or mechanisms can be configured or preconfigured for use during, before, or after the link switch:

- During the link switch, the UE stops an ongoing link recovery procedure if it was triggered before the switch. After the switch, the UE starts new radio link quality measurements and a new link recovery procedure.
- During the link switch, the UE pauses an ongoing link recovery procedure if it was triggered before the switch. The UE resumes link recovery procedure after the switch.
- During the link switch, UE refrains from initiating a link recovery procedure.
- During the link switch, the UE does not monitor PDCCH in the recoverySearchSpaceId linked to a control resource set.
- After the link switch, the UE can receive a new control resource set for monitoring PDCCH, based on a new link recovery search space set indicated by higher layer parameter recoverySearchSpaceId.
- If a new control resource set and a recovery search space set are not received after the switch, the UE can monitor PDCCH after the switch in the recoverySearchSpaceId linked to the control resource set configured before the switch. Alternately, the UE can forego monitoring PDCCH after the switch if a new control resource set and a recovery search space set are not received.
- After the link switch, UE can receive a new beam failure recovery configuration including a configuration for PRACH transmission dedicated for link recovery.

In the various embodiments described above, the UE can receive an indication of a link switch and take one or more actions (e.g., RLM-related and/or recovery-related) configured for use during the link switch. After the link switch, the UE can re-initiate synchronization to the satellite. During the re-synchronization to the satellite, however, the UE cannot reliably read PDCCH information (e.g., DCI), which can lead to an increasing likelihood of declaring RLF.

In some embodiments, to address this problem, the UE can also be configured with and/or allocated a time window for re-synchronization. This time window can be configured and/or allocated instead of, or in addition to, RLM-related and/or recovery-related parameters, behavior, and/or mechanisms discussed above. After the time window expires, the UE can resume regular RLM procedures. The duration of the re-synchronization time window can be based on timing differences illustrated in FIG. 7 (e.g., T2–T1).

In other embodiments, the UE can be configured to perform synchronization with the satellite also during the link switch. Although this configuration does not require a re-synchronization time window (discussed above), synchronization during link switch can result in increased energy consumption and reduced battery life of the UE.

In some embodiments, the UE can receive an indication of a pending link switch of the service (or access) link before the link switch occurs. Based on this information, the UE can stop RLM on the satellite beam(s) and perform a cell reselection, including measurement, ranking, and reselection to the best available cell, where the UE attempts to resume the previous connection. After successful resumption of the connection in the selected cell, the UE can restart the RLM procedure.

Figure 8A:
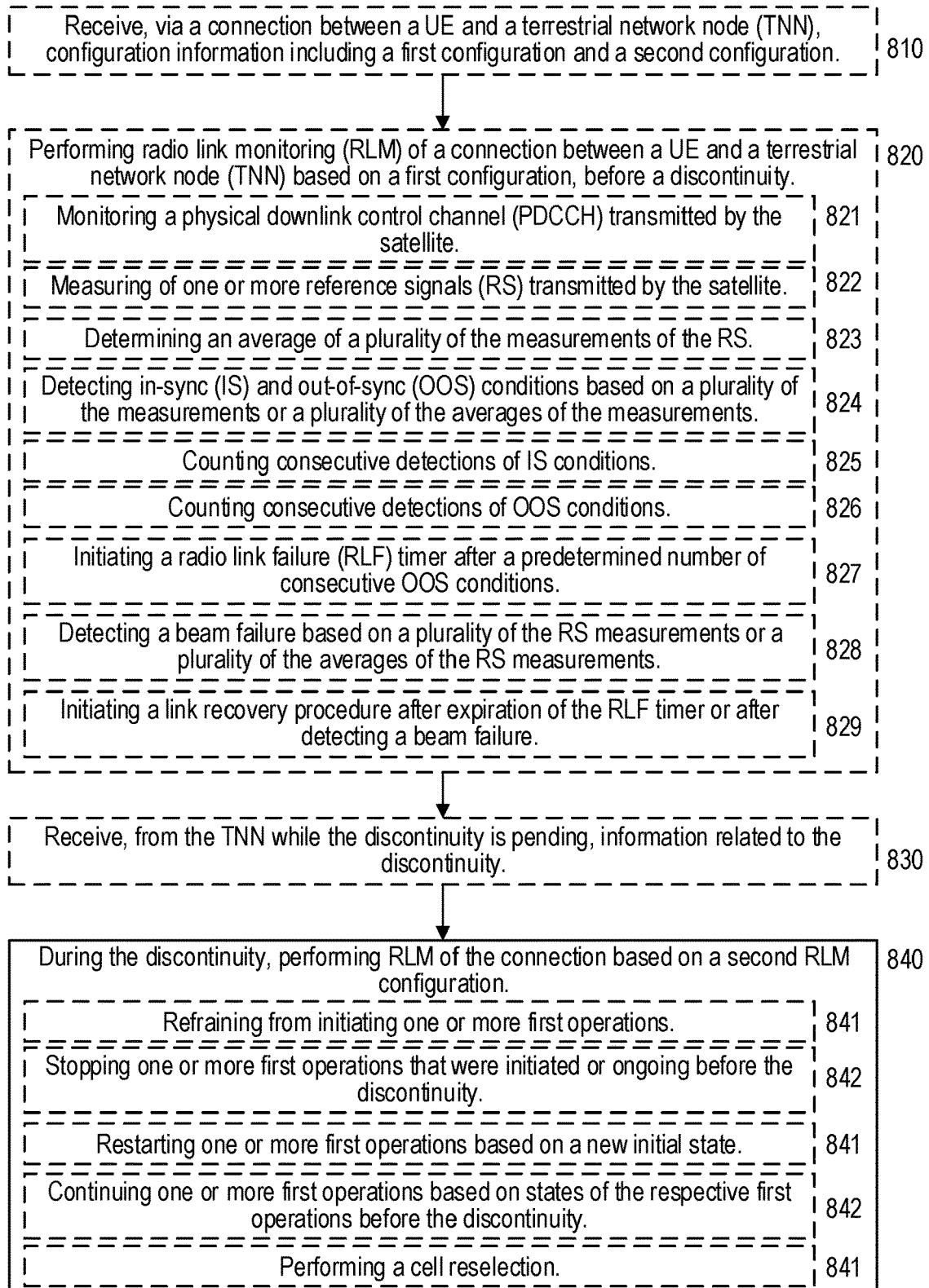
FIGS. 8A-8B, shows a flow diagram of an exemplary method (e.g., procedure) performed by a user equipment (UE, e.g., wireless device, MTC device, NB-IoT device, modem, etc. or component thereof), according to various exemplary embodiments of the present disclosure.
Figure 8B:
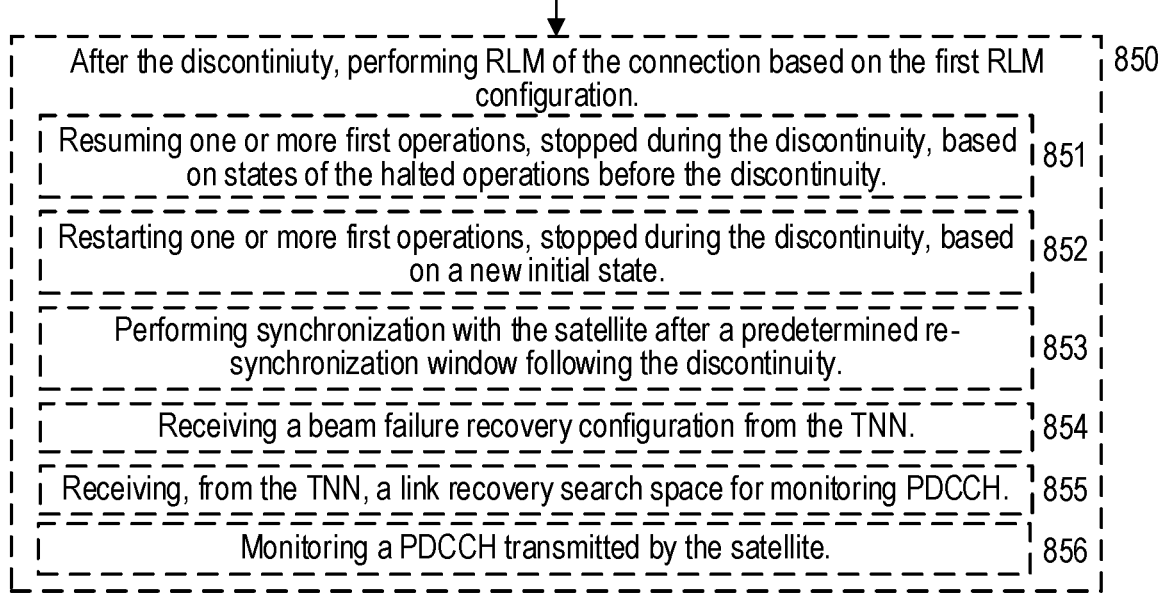
Figure 9:
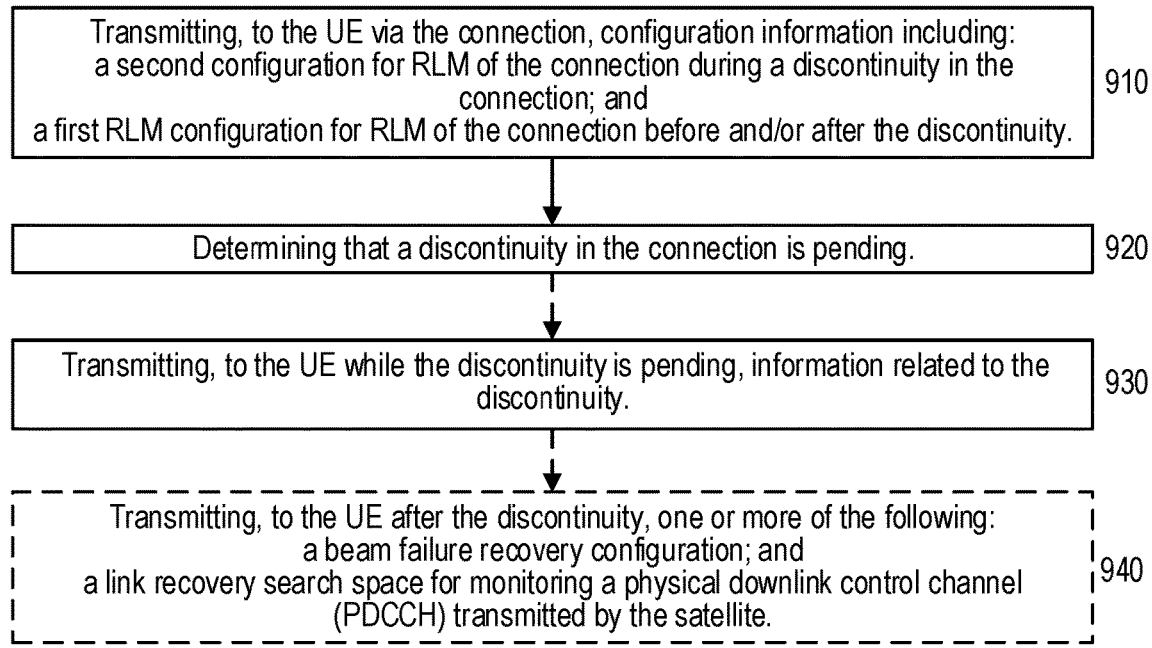
FIG. 9 shows a flow diagram of an exemplary method (e.g., procedure) performed by a network node (e.g., base station, gNB, eNB, MME, AMF, SMF, etc. or component thereof) in a radio access network (RAN), according to various exemplary embodiments of the present disclosure.

Embodiments discussed above in relation to FIGS. 4-7 are further illustrated by FIGS. 8-9, which show flow diagrams of exemplary methods performed by a UE and a terrestrial network node (TNN), respectively. For example, aspects of the various embodiments discussed above are features of operations shown in FIGS. 8-9.

FIG. 8 shows a flow diagram of an exemplary method (e.g., procedure) for performing radio link monitoring (RLM) in a combined terrestrial and satellite wireless communication network, according to various exemplary embodiments of the present disclosure. The exemplary method shown in FIG. 8 can be performed by a user equipment (e.g., UE, wireless device, MTC device, NB-IoT device, modem, etc. or component thereof) in communication with a terrestrial network node (TNN, e.g., base station, eNB, gNB, etc., or components thereof) via a satellite. Furthermore, the exemplary method shown in FIG. 8 can be used cooperatively with other exemplary methods described herein (e.g., FIG. 9) to provide various exemplary benefits described herein. Although FIG. 8 shows specific blocks in a particular order, the operations of the exemplary method can be performed in a different order than shown and can be combined and/or divided into blocks having different functionality than shown. Optional blocks or operations are indicated by dashed lines.

The exemplary method can include the operations of block 840, in which during a discontinuity in a connection between the UE and a terrestrial network node (TNN, e.g., in the combined satellite and terrestrial wireless communication network), the UE can perform RLM of the connection based on a second configuration. The connection can include a first link between the UE and a satellite and a second link between the satellite and the TNN. The discontinuity includes a link switch in at least one of the first link and the second link.

The exemplary method can also include the UE performing RLM of the connection based on a first configuration (e.g., differing from the second configuration in some manner) before and/or after the discontinuity. In other words, in some embodiments, the exemplary method can include the operations of block 820, where the UE can perform RLM of the connection based on the first configuration before the discontinuity. Likewise, in some embodiments, the exemplary method can include the operations of block 850, where the UE can perform RLM of the connection based on the first configuration after the discontinuity.

In some embodiments, the exemplary method can also include the operations of block 810, where the UE can receive, from the TNN via the connection, configuration information including the first configuration and the second configuration.

In some embodiments, the exemplary method can also include the operations of block 830, where the UE can receive, from the TNN while the discontinuity is pending (i.e., before the discontinuity actually occurs), information related to the discontinuity. In some embodiments, the information related to the discontinuity can include a duration and/or a periodicity associated with at least one of the following: the link switch, and use of the second configuration. In some embodiments, performing RLM based on the second configuration (e.g., in block 840) is done only during the duration (e.g., according to the information received in block 830).

In some embodiments, the information related to the discontinuity can include an indication of whether to use the first configuration or the second configuration during the link switch. In such embodiments, performing RLM based on the second configuration (e.g., in block 840) is based on the first configuration or the second configuration according to the indication. In some embodiments, the information related to the discontinuity can include at least a portion of the second configuration. For example, the at least a portion of the second configuration can include an indication of a phase change of a reference signal (RS), transmitted by the satellite, that is associated with the first and second configurations.

In various embodiments, performing RLM of the connection before, during, and after the discontinuity (e.g., in blocks 820, 840, and 850, respectively) can include various operations. For example, performing RLM of the connection before the discontinuity based on the first configuration can include at least one of the following first operations, which are identified as sub-blocks of block 820:

monitoring a physical downlink control channel (PDCCH) transmitted by the satellite (sub-block 821);
measuring of one or more reference signals (RS) transmitted by the satellite (sub-block 822);
determining an average of a plurality of the measurements of the RS (sub-block 823);
detecting in-sync (IS) and out-of-sync (OOS) conditions based on a plurality of the measurements or a plurality of the averages of the measurements (sub-block 824);
counting consecutive detections of IS conditions (sub-block 825);
counting consecutive detections of OOS conditions (sub-block 826);
initiating a radio link failure (RLF) timer after a predetermined number of consecutive OOS conditions (sub-block 827);
detecting a beam failure based on a plurality of the RS measurements or a plurality of the averages of the RS measurements (sub-block 828); and
initiating a link recovery procedure after expiration of the RLF timer or after detecting a beam failure (sub-block 829).

Similarly, performing RLM of the connection during the discontinuity based on the second configuration can include at least one of the following second operations, which are identified as sub-blocks of block 840:

refraining from initiating one or more first operations (sub-block 841);
stopping one or more first operations that were initiated or ongoing before the discontinuity (sub-block 842);
restarting one or more first operations based on a new initial state (sub-block 843);
continuing one or more first operations based on states of the respective first operations before the discontinuity (sub-block 844); and
performing a cell reselection (sub-block 845).

Similarly, performing RLM of the connection after the discontinuity based on the first configuration can include at least one of the following third operations, which are identified as sub-blocks of block 850:

resuming one or more first operations, stopped during the discontinuity, based on states of the halted operations before the discontinuity (sub-block 851);
restarting one or more first operations, stopped during the discontinuity, based on a new initial state (sub-block 852); and
performing synchronization with the satellite after a predetermined re-synchronization window following the discontinuity (sub-block 853);
receiving a beam failure recovery configuration from the TNN (sub-block 854); and
receiving, from the TNN, a link recovery search space for monitoring the PDCCH transmitted by the satellite (sub-block 855).

In some embodiments, performing RLM of the connection after the discontinuity based on the first configuration can also include the operations of sub-block 856, where the UE can monitor the PDCCH transmitted by the satellite based on one of the following:

a link recovery search space received from the TNN after the discontinuity (e.g., in sub-block 855); or
if no link recovery search space is received after the discontinuity, a link recovery search space configured before the discontinuity.

In addition, FIG. 9 shows a flow diagram of an exemplary method (e.g., procedure) for facilitating radio link monitoring (RLM) by a user equipment (UE) in a combined terrestrial and satellite wireless communication network, according to various exemplary embodiments of the present disclosure. The exemplary method can be performed by a terrestrial network node (TNN, e.g., base station, eNB, gNB, access gateway, etc., or component thereof) in communication with one or more user equipment (UEs, e.g., wireless devices, MTC devices, NB-IoT devices, modems, etc. or component thereof) via one or more satellites. Furthermore, the exemplary method shown in FIG. 9 can be used cooperatively with other exemplary methods described herein (e.g., FIG. 8) to provide various exemplary benefits described herein. Although FIG. 9 shows specific blocks in a particular order, the operations of the exemplary method can be performed in a different order than shown and can be combined and/or divided into blocks having different functionality than shown. Optional blocks or operations are indicated by dashed lines.

The exemplary method illustrated in FIG. 9 can include the operations of block 910, where the TNN can transmit configuration information to the UE via connection. For example, the configuration information can include a second configuration for RLM of the connection during a discontinuity in the connection, and a first configuration for RLM of the connection before and/or after the discontinuity. The first configuration can differ from the second configuration in some manner. The connection can include a first link between the UE and a satellite and a second link between the satellite and the TNN. The discontinuity can include a link switch in the first link and/or the second link.

The exemplary method can also include operations of block 920, where the TNN can determine that a discontinuity in the connection is pending (i.e., is expected but has not yet occurred). The exemplary method can also include operations of block 930, where the TNN can transmit, to the UE while the discontinuity is pending, information related to the discontinuity. In some embodiments, the exemplary method can also include operations of block 940, where the TNN can transmit to the UE after the discontinuity, one or more of the following: a beam failure recovery configuration; and a link recovery search space for monitoring a physical downlink control channel (PDCCH) transmitted by the satellite.

In some embodiments, the information related to the discontinuity can include a duration and/or a periodicity associated with at least one of the following: the link switch, and use of the second configuration. In some embodiments, the information related to the discontinuity can include an indication of whether to use the first configuration or the second configuration during the link switch. In some embodiments, the information related to the discontinuity can include at least a portion of the second configuration. For example, the at least a portion of the second configuration can include an indication of a phase change of a reference signal (RS), transmitted by the satellite, that is associated with the first and second configurations.

In various embodiments, the first configuration can be related to at least one of the following first operations by the UE before the discontinuity:
  monitoring a physical downlink control channel (PDCCH) transmitted by the satellite;
  measuring of one or more reference signals (RS) transmitted by the satellite;
  determining an average of a plurality of the measurements of the RS;
  detecting in-sync (IS) and out-of-sync (OOS) conditions based on a plurality of the measurements or a plurality of the averages of the measurements;
  counting consecutive detections of IS conditions;
  counting consecutive detections of OOS conditions;
  initiating a radio link failure (RLF) timer after a predetermined number of consecutive OOS conditions; and
  detecting a beam failure based on a plurality of the RS measurements or a plurality of the averages of the RS measurements; and
  initiating a link recovery procedure after expiration of the RLF timer or after detecting a beam failure.

Likewise, in various embodiments, the second configuration can be related to at least one of the following second operations by the UE during the discontinuity:
  refraining from initiating one or more of the first operations;
  stopping one or more first operations that were initiated or ongoing before the discontinuity;
  restarting one or more of the first operations based on a new initial state;
  continuing one or more of the first operations based on states of the respective operations before the discontinuity; and
  performing a cell reselection.

Likewise, in various embodiments, the first configuration can be related to at least one of the following third operations by the UE after the discontinuity:
  resuming one or more first operations, stopped during the discontinuity, based on states of the halted operations before the discontinuity;
  restarting one or more first operations, stopped during the discontinuity, based on a new initial state;
  synchronization with the satellite after a predetermined re-synchronization window following the discontinuity;
  beam failure recovery;
  link recovery; and
  PDCCH monitoring.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 10:
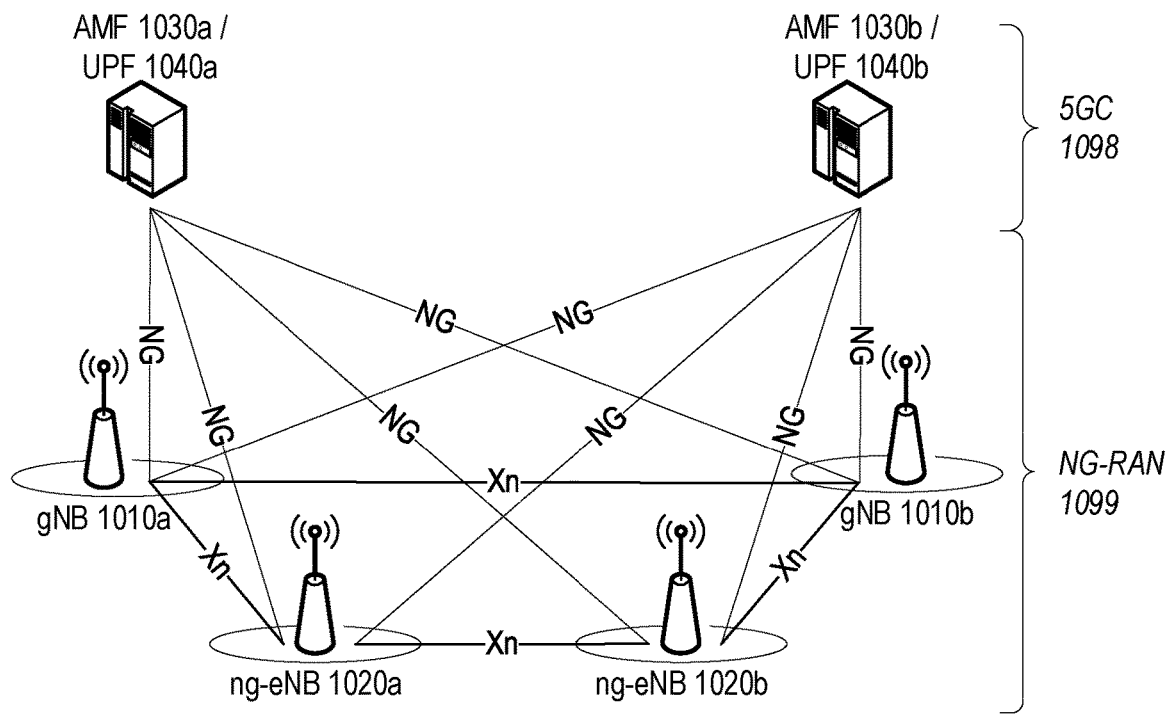
FIG. 10 shows a high-level view of an exemplary 5G network architecture.

FIG. 10 shows a high-level view of an exemplary 5G network architecture, including next-generation RAN (NG-RAN) 1099 and 5G core network (5GC) 1098. As shown in the figure, NG-RAN 1099 can include gNBs 1010 (e.g., 1010a,b) and ng-eNBs 1020 (e.g., 1020a,b) that are interconnected with each other via respective Xn interfaces. The gNBs and ng-eNBs are also connected via the NG interfaces to 5GC 1098, more specifically to the AMF (Access and Mobility Management Function) 1030 (e.g., AMFs 1030a,b) via respective NG-C interfaces and to the UPF (User Plane Function) 1040 (e.g., UPFs 1040a,b) via respective NG-U interfaces.

Each of the gNBs 1010 can support the NR radio interface, including frequency division duplexing (FDD), time division duplexing (TDD), or a combination thereof. Each of ng-eNBs 1020 supports the LTE radio interface and connect to the 5GC via the NG interface, whereas conventional LTE eNBs connect to an EPC via the X2 interface (e.g., as illustrated in FIG. 1).

Each of gNBs 1010a,b shown in FIG. 10 can include a central (or centralized) unit (CU or gNB-CU) and one or more distributed (or decentralized) units (DU or gNB-DU). CUs are logical nodes that host higher-layer protocols and perform various gNB functions such controlling the operation of DUs. Likewise, DUs are logical nodes that hosts lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. A gNB-CU connects to its gNB-DUs over respective F1 logical interfaces.

Although not shown, NG-RAN 1099 can include one or more satellite gateways, such as illustrated in FIGS. 4-5 and 7.

Figure 11:
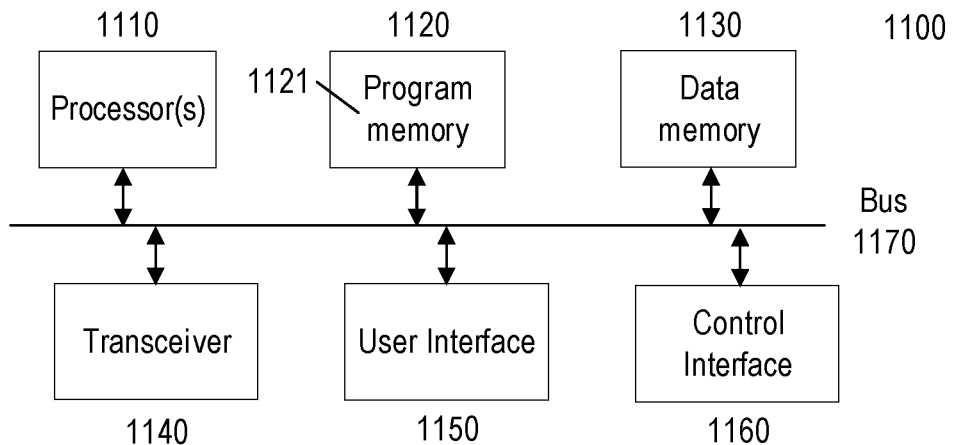
FIG. 11 shows a block diagram of an exemplary wireless device or UE, according to various exemplary embodiments of the present disclosure.

FIG. 11 shows a block diagram of an exemplary wireless device or user equipment (UE) 1100 (hereinafter referred to as "UE 1100") according to various embodiments of the present disclosure, including those described above with reference to other figures. For example, UE 1100 can be configured by execution of instructions, stored on a computer-readable medium, to perform operations corresponding to one or more of the exemplary methods and/or procedures described above.

UE 1100 can include a processor 1110 (also referred to as "processing circuitry") that can be operably connected to a program memory 1120 and/or a data memory 1130 via a bus 1170 that can comprise parallel address and data buses, serial ports, or other methods and/or structures known to those of ordinary skill in the art. Program memory 1120 can store software code, programs, and/or instructions (collectively shown as computer program product 1121 in FIG. 11) that, when executed by processor 1110, can configure and/or facilitate UE 1100 to perform various operations, including operations described below. For example, execution of such instructions can configure and/or facilitate UE 1100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1140, user interface 1150, and/or control interface 1160.

As another example, processor 1110 can execute program code stored in program memory 1120 that corresponds to MAC, RLC, PDCP, and RRC layer protocols standardized by 3GPP (e.g., for NR and/or LTE). As a further example, processor 1110 can execute program code stored in program memory 1120 that, together with radio transceiver 1140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1110 can execute program code stored in program memory 1120 that, together with radio transceiver 1140, implements device-to-device (D2D) communications with other compatible devices and/or UEs.

Program memory 1120 can also include software code executed by processor 1110 to control the functions of UE 1100, including configuring and controlling various components such as radio transceiver 1140, user interface 1150, and/or host interface 1160. Program memory 1120 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1120 can comprise an external storage arrangement (not shown) remote from UE 1100, from which the instructions can be downloaded into program memory 1120 located within or removably coupled to UE 1100, so as to enable execution of such instructions.

Data memory 1130 can include memory area for processor 1110 to store variables used in protocols, configuration, control, and other functions of UE 1100, including operations corresponding to, or comprising, any of the exemplary methods and/or procedures described herein. Moreover, program memory 1120 and/or data memory 1130 can include non-volatile memory (e.g., flash memory), volatile memory (e.g., static or dynamic RAM), or a combination thereof. Furthermore, data memory 1130 can comprise a memory slot by which removable memory cards in one or more formats (e.g., SD Card, Memory Stick, Compact Flash, etc.) can be inserted and removed.

Persons of ordinary skill will recognize that processor 1110 can include multiple individual processors (including, e.g., multi-core processors), each of which implements a portion of the functionality described above. In such cases, multiple individual processors can be commonly connected to program memory 1120 and data memory 1130 or individually connected to multiple individual program memories and or data memories. More generally, persons of ordinary skill in the art will recognize that various protocols and other functions of UE 1100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1140 can include radio-frequency transmitter and/or receiver functionality that facilitates the UE 1100 to communicate with other equipment supporting like wireless communication standards and/or protocols. In some exemplary embodiments, the radio transceiver 1140 includes one or more transmitters and one or more receivers that enable UE 1100 to communicate according to various protocols and/or methods proposed for standardization by 3GPP and/or other standards bodies. For example, such functionality can operate cooperatively with processor 1110 to implement a PHY layer based on OFDM, OFDMA, and/or SC-FDMA technologies, such as described herein with respect to other figures.

In some exemplary embodiments, radio transceiver 1140 includes one or more transmitters and one or more receivers that can facilitate the UE 1100 to communicate with various LTE, LTE-Advanced (LTE-A), and/or NR networks according to standards promulgated by 3GPP. In some exemplary embodiments of the present disclosure, the radio transceiver 1140 includes circuitry, firmware, etc. necessary for the UE 1100 to communicate with various NR, NR-U, LTE, LTE-A, LTE-LAA, UMTS, and/or GSM/EDGE networks, also according to 3GPP standards. In some embodiments, radio transceiver 1140 can include circuitry supporting D2D communications between UE 1100 and other compatible devices.

In some embodiments, radio transceiver 1140 includes circuitry, firmware, etc. necessary for the UE 1100 to communicate with various CDMA2000 networks, according to 3GPP2 standards. In some embodiments, the radio transceiver 1140 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1140 can include a transceiver that is capable of wired communication, such as by using IEEE 802.3 Ethernet technology. The functionality particular to each of these embodiments can be coupled with and/or controlled by other circuitry in the UE 1100, such as the processor 1110 executing program code stored in program memory 1120 in conjunction with, and/or supported by, data memory 1130.

User interface 1150 can take various forms depending on the particular embodiment of UE 1100, or can be absent from UE 1100 entirely. In some embodiments, user interface 1150 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1100 can comprise a tablet computing device including a larger touchscreen display. In such embodiments, one or more of the mechanical features of the user interface 1150 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1100 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1100 having a touch screen display are capable of receiving user inputs, such as inputs related to exemplary methods and/or procedures described herein or otherwise known to persons of ordinary skill in the art.

In some embodiments, UE 1100 can include an orientation sensor, which can be used in various ways by features and functions of UE 1100. For example, the UE 1100 can use outputs of the orientation sensor to determine when a user has changed the physical orientation of the UE 1100's touch screen display. An indication signal from the orientation sensor can be available to any application program executing on the UE 1100, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1160 of the UE 1100 can take various forms depending on the particular exemplary embodiment of UE 1100 and of the particular interface requirements of other devices that the UE 1100 is intended to communicate with and/or control. For example, the control interface 1160 can comprise an RS-232 interface, an RS-4115 interface, a USB interface, an HDMI interface, a Bluetooth interface, an IEEE ("Firewire") interface, an I²C interface, a PCMCIA interface, or the like. In some exemplary embodiments of the present disclosure, control interface 1160 can comprise an IEEE 802.3 Ethernet interface such as described above. In some exemplary embodiments of the present disclosure, the control interface 1160 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1100 can comprise more functionality than is shown in FIG. 11 including, for example, a video and/or still-image camera, microphone, media player and/or recorder, etc. Moreover, radio transceiver 1140 can include circuitry necessary to communicate using additional radio-frequency communication standards including Bluetooth, GPS, and/or others. Moreover, the processor 1110 can execute software code stored in the program memory 1120 to control such additional functionality. For example, directional velocity and/or position estimates output from a GPS receiver can be available to any application program executing on the UE 1100, including various exemplary methods and/or computer-readable media according to various exemplary embodiments of the present disclosure.

Figure 12:
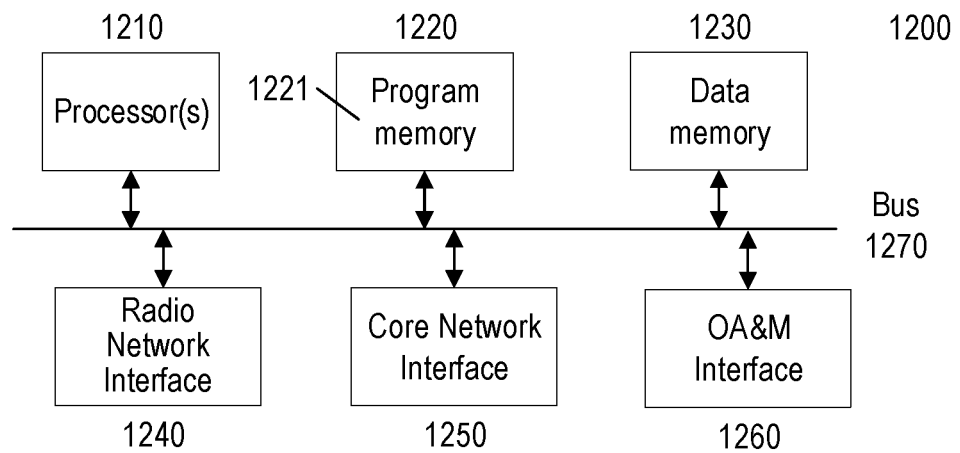
FIG. 12 shows a block diagram of an exemplary network node, according to various exemplary embodiments of the present disclosure.

FIG. 12 shows a block diagram of an exemplary network node 1200 according to various embodiments of the present disclosure, including those described above with reference to other figures. For example, exemplary network node 1200 can be configured by execution of instructions, stored on a computer-readable medium, to perform operations corresponding to one or more of the exemplary methods and/or procedures described above. In some exemplary embodiments, network node 1200 can comprise a base station, eNB, gNB, or one or more components thereof. For example, network node 1200 can be configured as a central unit (CU) and one or more distributed units (DUs) according to NR gNB architectures specified by 3GPP. More generally, the functionally of network node 1200 can be distributed across various physical devices and/or functional units, modules, etc.

Network node 1200 can include processor 1210 (also referred to as "processing circuitry") that is operably connected to program memory 1220 and data memory 1230 via bus 1270, which can include parallel address and data buses, serial ports, or other methods and/or structures known to those of ordinary skill in the art.

Program memory 1220 can store software code, programs, and/or instructions (collectively shown as computer program product 1221 in FIG. 12) that, when executed by processor 1210, can configure and/or facilitate network node 1200 to perform various operations. For example, execution of such stored instructions can configure network node 1200 to communicate with one or more other devices using protocols according to various embodiments of the present disclosure, including one or more exemplary methods and/or procedures discussed above. Program memory 1220 can also comprise software code executed by processor 1210 that can facilitate and specifically configure network node 1200 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1240 and core network interface 1250. By way of example and without limitation, core network interface 1250 can comprise the S1 interface and radio network interface 1240 can comprise the Uu interface, as standardized by 3GPP. Program memory 1220 can further comprise software code executed by processor 1210 to control the functions of network node 1200, including configuring and controlling various components such as radio network interface 1240 and core network interface 1250.

Data memory 1230 can comprise memory area for processor 1210 to store variables used in protocols, configuration, control, and other functions of network node 1200. As such, program memory 1220 and data memory 1230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 can include multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill will recognize that various protocols and other functions of network node 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 can comprise transmitters, receivers, signal processors, ASICs, antennas, beamforming units, and other circuitry that enables network node 1200 to communicate with other equipment such as, in some embodiments, a plurality of compatible user equipment (UE). In some embodiments, interface 1240 can also enable network node 1200 to communicate with compatible satellites of a satellite communication network. In some exemplary embodiments, radio network interface 1240 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1240. According to further exemplary embodiments of the present disclosure, the radio network interface 1240 can comprise a PHY layer based on OFDM, OFDMA, and/or SC-FDMA technologies. In some embodiments, the functionality of such a PHY layer can be provided cooperatively by radio network interface 1240 and processor 1210 (including program code in memory 1220).

Core network interface 1250 can comprise transmitters, receivers, and other circuitry that enables network node 1200 to communicate with other equipment in a core network such as, in some embodiments, circuit-switched (CS) and/or packet-switched Core (PS) networks. In some embodiments, core network interface 1250 can comprise the S1 interface standardized by 3GPP. In some embodiments, core network interface 1250 can comprise the NG interface standardized by 3GPP. In some exemplary embodiments, core network interface 1250 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1260 can comprise transmitters, receivers, and other circuitry that enables network node 1200 to communicate with external networks, computers, databases, and the like for purposes of operations, administration, and maintenance of network node 1200 or other network equipment operably connected thereto. Lower layers of OA&M interface 1260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

Figure 13:
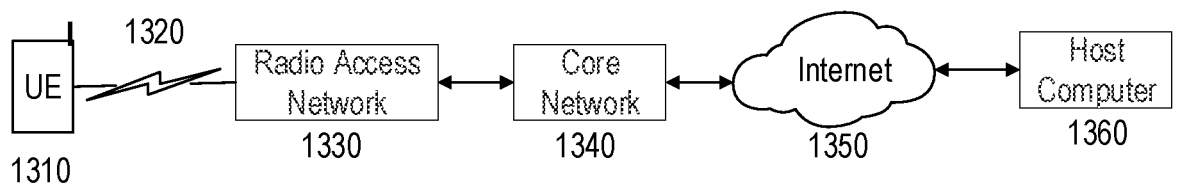
FIG. 13 shows a block diagram of an exemplary network configured to provide over-the-top (OTT) data services between a host computer and a UE, according to various exemplary embodiments of the present disclosure.

FIG. 13 is a block diagram of an exemplary communication network configured to provide over-the-top (OTT) data services between a host computer and a user equipment (UE), according to one or more exemplary embodiments of the present disclosure. UE 1310 can communicate with radio access network (RAN) 1330 over radio interface 1320, which can be based on protocols described above including, e.g., LTE, LTE-A, and 5G/NR. For example, UE 1310 can be configured and/or arranged as shown in other figures discussed above.

RAN 1330 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1330 can cooperatively operate using licensed and unlicensed spectrum. In some embodiments, RAN 1330 can include, or be capable of communication with, one or more satellites comprising a satellite access network.

RAN 1330 can further communicate with core network 1340 according to various protocols and interfaces described above. For example, one or more apparatus (e.g., base stations, eNBs, gNBs, etc.) comprising RAN 1330 can communicate to core network 1340 via core network interface 1250 described above. In some exemplary embodiments, RAN 1330 and core network 1340 can be configured and/or arranged as shown in other figures discussed above. For example, eNBs comprising an E-UTRAN 1330 can communicate with an EPC core network 1340 via an S1 interface, such as shown in FIG. 1. As another example, gNBs comprising a NR RAN 1330 can communicate with a 5GC core network 1330 via an NG interface.

Core network 1340 can further communicate with an external packet data network, illustrated in FIG. 13 as Internet 1350, according to various protocols and interfaces known to persons of ordinary skill in the art. Many other devices and/or networks can also connect to and communicate via Internet 1350, such as exemplary host computer 1360. In some exemplary embodiments, host computer 1360 can communicate with UE 1310 using Internet 1350, core network 1340, and RAN 1330 as intermediaries. Host computer 1360 can be a server (e.g., an application server) under ownership and/or control of a service provider. Host computer 1360 can be operated by the OTT service provider or by another entity on the service provider's behalf.

For example, host computer 1360 can provide an over-the-top (OTT) packet data service to UE 1310 using facilities of core network 1340 and RAN 1330, which can be unaware of the routing of an outgoing/incoming communication to/from host computer 1360. Similarly, host computer 1360 can be unaware of routing of a transmission from the host computer to the UE, e.g., the routing of the transmission through RAN 1330. Various OTT services can be provided using the exemplary configuration shown in FIG. 13 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 13 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for RAN 1330 operation in conjunction with a non-terrestrial network (e.g., satellite access network), such as by configuring UEs—such as UE 1310—in communication with a satellite to perform in a particular manner during signal interruption due to satellite link switch. For example, by configuring the UE to use different RLM- and/or recovery-related parameters, behavior, and/or mechanisms to use during the link switch, such techniques can reduce undesired behavior due to erroneous or spurious measurements. When used in LTE or NR UEs (e.g., UE 1310) and eNBs or gNBs (e.g., gNBs comprising RAN 1330), exemplary embodiments described herein can provide various improvements, benefits, and/or advantages to OTT service providers and end-users, including more consistent data throughout and fewer delays without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another can be used synonymously herein, that there can be instances when such words are not intended to be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method for performing radio link monitoring (RLM) in a combined terrestrial and satellite wireless communication network, the method comprising:
    performing RLM of a connection between a UE and a terrestrial network node (TNN)
       based on a first RLM configuration, wherein the connection includes a first link
       between the UE and a satellite and a second link between the satellite and the TNN;
    detecting a discontinuity in the connection, wherein the discontinuity comprises a link switch in at least one of the first link and the second link; and
    in response to detecting the discontinuity, performing RLM of the connection based on a second RLM configuration.

2. The method of embodiment 1, wherein detecting the discontinuity comprises receiving, from the TNN, information related to the discontinuity prior to the occurrence of the link switch.

3. The method of embodiment 2, wherein the information related to the discontinuity comprises a duration and a periodicity associated with one of the following:
    the link switch; and
    use of the second RLM configuration.

4. The method of embodiment 3, wherein RLM of the connection is performed based on the second RLM configuration only during the duration indicated by the information related to the discontinuity.
5. The method of any of embodiments 2-4, wherein:
   the information related to the discontinuity comprises an indication of whether to use the second RLM configuration or the second RLM configuration during the link switch; and
   performing RLM of the connection, in response to detecting the discontinuity, is further based on the indication.
6. The method of any of embodiments 2-5, wherein the information related to the discontinuity comprises at least a portion of the second RLM configuration.
7. The method of embodiment 6, wherein the at least a portion of the second RLM configuration comprises a phase change of a reference signal (RS), transmitted by the satellite, that is associated with the first and second RLM configurations.
8. The method of any of embodiments 1-7, wherein the performing RLM based on the first RLM configuration comprises at least one of the following operations:
   monitoring a physical downlink control channel (PDCCH) transmitted by the satellite;
   measuring of one or more reference signals (RS) transmitted by the satellite;
   determining an average of a plurality of the measurements of the RS;
   detecting in-sync (IS) and out-of-sync (OOS) conditions based on a plurality of the measurements or a plurality of the averages of the measurements;
   counting consecutive detections of IS conditions;
   counting consecutive detections of OOS conditions;
   initiating a radio link failure (RLF) timer after a predetermined number of consecutive OOS conditions; and
   performing a link recovery procedure after expiration of the RLF timer.
9. The method of embodiment 8, wherein performing RLM based on the second RLM configuration comprises restarting the counting of consecutive IS conditions or the counting of consecutive OOS conditions.
10. The method of any of embodiments 8-9, further comprising, after completion of the link switch of at least one of the first and second links of the connection, performing RLM of the connection based on the first RLM configuration.
11. The method of embodiment 10, wherein performing RLM based on the second RLM configuration comprises halting one or more of the operations associated with the first RLM configuration.
12. The method of embodiment 11, wherein performing RLM of the connection, after completion of the link switch, comprises resuming the one or more halted operations based on a state of the one or more halted operations prior to the link switch.
13. The method of embodiment 11, wherein performing RLM of the connection, after completion of the link switch, comprises restarting the one or more halted operations based on a new initial state.
14. The method of any of embodiments 10-13, wherein performing RLM of the connection based on the first RLM configuration is delayed for a predetermined re-synchronization window after completion of the link switch.
15. The method of any of embodiments 10-14, further comprising:
   receiving, after completion of the link switch, a link recovery configuration; and
   performing link recovery based on the link recovery configuration before performing RLM of the connection based on the first RLM configuration.
16. The method of embodiment 2, wherein:
   the information related to the discontinuity indicates that the link switch of the first link is pending; and
   performing RLM of the connection based on a second RLM configuration comprises halting RLM of the first link and performing a cell reselection.
17. A method for facilitating radio link monitoring (RLM) by a user equipment (UE) in a combined terrestrial and satellite wireless communication network, the method performed by a terrestrial network node (TNN) and comprising:
   establishing a connection with the UE, wherein the connection includes a first link between the UE and a satellite and a second link between the satellite and the TNN;
   transmitting, to the UE via the connection, configuration information comprising:
      a second RLM configuration for performing RLM of the connection in response to a discontinuity in the connection, wherein the discontinuity comprises a link switch in at least one of the first link and the second link; and
      a first RLM configuration for performing RLM of the connection before and after the discontinuity; and
   transmitting information related to the discontinuity to the UE prior to the occurrence of the discontinuity.
18. The method of embodiment 17, wherein the information related to the discontinuity comprises an indication of whether to use the second RLM configuration or the second RLM configuration during the link switch.
19. The method of any of embodiments 17-18, wherein the information related to the discontinuity comprises at least a portion of the second RLM configuration.
20. The method of embodiment 19, wherein the at least a portion of the second RLM configuration comprises a phase change of a reference signal (RS), transmitted by the satellite, that is associated with the first and second RLM configurations.
21. The method of any of embodiments 17-20, wherein the first RLM configuration comprises information related to at least one of the following UE operations:
   monitoring a physical downlink control channel (PDCCH) transmitted by the satellite;
   measuring of one or more reference signals (RS) transmitted by the satellite;
   determining an average of a plurality of the measurements of the RS;
   detecting in-sync (IS) and out-of-sync (OOS) conditions based on a plurality of the measurements or a plurality of the averages of the measurements;
   counting consecutive detections of IS conditions;
   counting consecutive detections of OOS conditions;
   initiating a radio link failure (RLF) timer after a predetermined number of consecutive OOS conditions; and
   performing a link recovery procedure after expiration of the RLF timer.

22. The method of embodiment 21, wherein the second RLM configuration comprises restarting the counting of consecutive IS conditions or the counting of consecutive OOS conditions.

23. The method of any of embodiments 21-22, wherein the second RLM configuration comprises halting one or more of the operations associated with the first RLM configuration.

24. The method of embodiment 23, wherein the first RLM configuration comprises resuming the one or more halted operations based on a state of the one or more halted operations prior to the link switch.

25. The method of embodiment 23, wherein the first RLM configuration comprises restarting the one or more halted operations based on a new initial state.

26. The method of any of embodiments 17-25, wherein the first RLM configuration comprises a predetermined re-synchronization window for delaying use of the first RLM configuration after completion of the link switch.

27. The method of any of embodiments 17-26, further comprising transmitting, to the UE after completion of the link switch, a link recovery configuration.

28. The method of any of embodiments 17-27, wherein the information related to the discontinuity indicates that the link switch of the first link is pending.

29. The method of any of embodiments 17-28, further comprising:
detecting an upcoming discontinuity in the connection; and
transmitting the information related to the discontinuity to the UE in response to the detection.

30. A user equipment (UE) configured to perform radio link monitoring (RLM) in a combined terrestrial and satellite wireless communication network, the UE comprising:
communication circuitry configured to communicate with one or more network nodes in the combined terrestrial and satellite wireless communication network; and
processing circuitry operatively associated with the communication circuitry and configured to perform operations corresponding to the methods of any of exemplary embodiments 1-16.

31. A non-transitory, computer-readable medium storing computer-executable instructions that, when executed by at least one processor of a user equipment (UE), configure the UE to perform operations corresponding to the methods of any of exemplary embodiments 1-16.

32. A terrestrial network node (TNN) configured to facilitate radio link monitoring (RLM) by user equipment (UEs) in a combined terrestrial and satellite wireless communication network, the TNN comprising:
communication circuitry configured to communicate with one or more UEs and one or more satellites; and
processing circuitry operatively associated with the communication circuitry and configured to perform operations corresponding to the methods of any of exemplary embodiments 17-29.

33. A non-transitory, computer-readable medium storing computer-executable instructions that, when executed by at least one processor of a terrestrial network node (TNN) in a combined terrestrial and satellite wireless communication network, configure the TNN to perform operations corresponding to the methods of any of exemplary embodiments 17-29.

The invention claimed is:

1. A method, performed by a user equipment (UE), for radio link monitoring (RLM) in a combined terrestrial and satellite wireless communication network, the method comprising:
during a discontinuity in a connection between the UE and a terrestrial network node (TNN), performing RLM of the connection based on a second configuration, wherein:
the connection includes a first link between the UE and a satellite and a second link between the satellite and the TNN, and
the discontinuity comprises a link switch in at least one of the first link and the second link; and
performing RLM of the connection based on a first configuration, during at least one of the following: before the discontinuity, and after the discontinuity,
performing RLM of the connection before the discontinuity based on the first configuration including at least one of the following first operations:
monitoring a physical downlink control channel (PDCCH) transmitted by the satellite;
measuring of one or more reference signals (RS) transmitted by the satellite;
determining an average of a plurality of the measurements of the RS;
detecting in-sync (IS) and out-of-sync (OOS) conditions based on a plurality of the measurements or a plurality of the averages of the measurements;
counting consecutive detections of IS conditions;
counting consecutive detections of OOS conditions;
initiating a radio link failure (RLF) timer after a predetermined number of consecutive OOS conditions;
detecting a beam failure based on a plurality of the RS measurements or a plurality of the averages of the RS measurements; and
initiating a link recovery procedure after expiration of the RLF timer or after detecting a beam failure; and
performing RLM of the connection after the discontinuity based on the first configuration comprising monitoring the PDCCH transmitted by the satellite, being based on one of the following:
a link recovery search space received from the TNN after the discontinuity; or
if no link recovery search space is received after the discontinuity, a link recovery search space configured before the discontinuity.

2. The method of claim 1, further comprising receiving, from the TNN while the discontinuity is pending, information related to the discontinuity.

3. The method of claim 2, wherein:
the information related to the discontinuity includes at least one of a duration and a periodicity associated with at least one of the following: the link switch, and use of the second configuration; and
the RLM of the connection based on the second configuration is performed only during the duration.

4. The method of claim 2, wherein:
the information related to the discontinuity comprises an indication of whether to use the first configuration or the second configuration during the link switch; and
performing RLM of the connection during the discontinuity is based on the first configuration or the second configuration according to the indication.

5. The method of claim 2, wherein:
the information related to the discontinuity comprises at least a portion of the second configuration; and the at least a portion of the second configuration includes an indication of a phase change of a reference signal (RS), transmitted by the satellite, that is associated with the first and second configurations.

6. The method of claim 1, wherein performing RLM during the discontinuity based on the second configuration comprises at least one of the following second operations:
  refraining from initiating one or more first operations;
  stopping one or more first operations that were initiated or ongoing before the discontinuity;
  restarting one or more first operations based on a new initial state;
  continuing one or more first operations based on states of the respective first operations before the discontinuity; and
  performing a cell reselection.

7. The method of claim 1, wherein performing RLM of the connection after the discontinuity based on the first configuration comprises at least one of the following third operations:
  resuming one or more first operations, stopped during the discontinuity, based on states of the halted operations before the discontinuity;
  restarting one or more first operations, stopped during the discontinuity, based on a new initial state; and
  performing synchronization with the satellite after a pre-determined re-synchronization window following the discontinuity;
  receiving a beam failure recovery configuration from the TNN; and
  receiving, from the TNN, a link recovery search space for monitoring the PDCCH transmitted by the satellite.

8. A user equipment (UE) configured to perform radio link monitoring (RLM) in a combined terrestrial and satellite wireless communication network, the UE comprising:
  transceiver circuitry configured to communicate with one or more terrestrial network nodes (TNNs) via one or more satellites; and
  processing circuitry operatively coupled to the transceiver circuitry, whereby the processing circuitry and the transceiver circuitry are configured to:
    during a discontinuity in a connection between the UE and a terrestrial network node (TNN), perform RLM of the connection based on a second configuration, wherein:
      the connection includes a first link between the UE and a satellite and a second link between the satellite and the TNN, and
      the discontinuity comprises a link switch in at least one of the first link and the second link; and
    perform RLM of the connection based on a first configuration, during at least one of the following: before the discontinuity, and after the discontinuity,
    performing RLM of the connection before the discontinuity based on the first configuration including at least one of the following first operations:
      monitoring a physical downlink control channel (PDCCH) transmitted by the satellite;
      measuring of one or more reference signals (RS) transmitted by the satellite;
      determining an average of a plurality of the measurements of the RS;
      detecting in-sync (IS) and out-of-sync (OOS) conditions based on a plurality of the measurements or a plurality of the averages of the measurements;
      counting consecutive detections of IS conditions;
      counting consecutive detections of OOS conditions;
      initiating a radio link failure (RLF) timer after a predetermined number of consecutive OOS conditions;
      detecting a beam failure based on a plurality of the RS measurements or a plurality of the averages of the RS measurements; and
      initiating a link recovery procedure after expiration of the RLF timer or after detecting a beam failure; and
    performing RLM of the connection after the discontinuity based on the first configuration comprising monitoring the PDCCH transmitted by the satellite, being based on one of the following:
      a link recovery search space received from the TNN after the discontinuity; or
      if no link recovery search space is received after the discontinuity, a link recovery search space configured before the discontinuity.

9. A non-transitory, computer-readable medium storing computer-executable instructions that, when executed by processing circuitry of a user equipment (UE) configured to perform radio link monitoring (RLM) in a combined terrestrial and satellite wireless communication network, configure the UE:
  during a discontinuity in a connection between the UE and a terrestrial network node (TNN), perform RLM of the connection based on a second configuration, wherein:
    the connection includes a first link between the UE and a satellite and a second link between the satellite and the TNN, and
    the discontinuity comprises a link switch in at least one of the first link and the second link; and
  perform RLM of the connection based on a first configuration, during at least one of the following: before the discontinuity, and after the discontinuity,
  performing RLM of the connection before the discontinuity based on the first configuration including at least one of the following first operations:
    monitoring a physical downlink control channel (PDCCH) transmitted by the satellite;
    measuring of one or more reference signals (RS) transmitted by the satellite;
    determining an average of a plurality of the measurements of the RS;
    detecting in-sync (IS) and out-of-sync (OOS) conditions based on a plurality of the measurements or a plurality of the averages of the measurements;
    counting consecutive detections of IS conditions;
    counting consecutive detections of OOS conditions;
    initiating a radio link failure (RLF) timer after a predetermined number of consecutive OOS conditions;
    detecting a beam failure based on a plurality of the RS measurements or a plurality of the averages of the RS measurements; and
    initiating a link recovery procedure after expiration of the RLF timer or after detecting a beam failure; and
  performing RLM of the connection after the discontinuity based on the first configuration comprising monitoring the PDCCH transmitted by the satellite, being based on one of the following:
    a link recovery search space received from the TNN after the discontinuity; or
    if no link recovery search space is received after the discontinuity, a link recovery search space configured before the discontinuity.

* * * * *